United States Patent
Schaub et al.

(10) Patent No.: US 12,001,365 B2
(45) Date of Patent: Jun. 4, 2024

(54) SCATTER AND GATHER STREAMING DATA THROUGH A CIRCULAR FIFO

(71) Applicant: Apple Inc., Cupertino, CA (US)

(72) Inventors: Marc A. Schaub, Sunnyvale, CA (US); Roy G. Moss, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/922,623

(22) Filed: Jul. 7, 2020

(65) Prior Publication Data

US 2022/0012201 A1 Jan. 13, 2022

(51) Int. Cl.
| | |
|---|---|
| *G06F 9/30* | (2018.01) |
| *G06F 9/50* | (2006.01) |
| *G06F 9/54* | (2006.01) |
| *G06F 13/16* | (2006.01) |
| *G06F 13/28* | (2006.01) |
| *G06F 13/37* | (2006.01) |

(52) U.S. Cl.
CPC .......... *G06F 13/37* (2013.01); *G06F 9/30069* (2013.01); *G06F 9/5022* (2013.01); *G06F 9/544* (2013.01); *G06F 13/1642* (2013.01); *G06F 13/28* (2013.01)

(58) Field of Classification Search
None
See application file for complete search history.

(56) References Cited

U.S. PATENT DOCUMENTS

| | | | |
|---|---|---|---|
| 4,864,496 | A | 9/1989 | Triolo et al. |
| 5,434,996 | A | 7/1995 | Bell |
| 5,754,614 | A | 5/1998 | Wingen |

(Continued)

FOREIGN PATENT DOCUMENTS

| | | |
|---|---|---|
| JP | 2002254729 | 9/2002 |
| JP | 2017506378 | 3/2017 |
| WO | 2013129031 | 9/2013 |

OTHER PUBLICATIONS

Cummings et al., "Simulation and Syntheses Techniques for Asynchronous FIFO Design with Asynchronous Pointer Comparisons", Sunburst Design, Inc., 2002, 18 pages.

(Continued)

*Primary Examiner* — Henry Tsai
*Assistant Examiner* — Christopher A Bartels
(74) *Attorney, Agent, or Firm* — Robert C. Kowert; Kowert, Hood, Munyon, Rankin & Goetzel, P.C.

(57) ABSTRACT

Systems, apparatuses, and methods for performing scatter and gather direct memory access (DMA) streaming through a circular buffer are described. A system includes a circular buffer, producer DMA engine, and consumer DMA engine. After the producer DMA engine writes or skips over a given data chunk of a first frame to the buffer, the producer DMA engine sends an updated write pointer to the consumer DMA engine indicating that a data credit has been committed to the buffer and that the data credit is ready to be consumed. After the consumer DMA engine reads or skips over the given data chunk of the first frame from the buffer, the consumer DMA engine sends an updated read pointer to the producer DMA engine indicating that the data credit has been consumed and that space has been freed up in the buffer to be reused by the producer DMA engine.

20 Claims, 23 Drawing Sheets

(56) References Cited

U.S. PATENT DOCUMENTS

| | | | |
|---|---|---|---|
| 5,951,635 A | 9/1999 | Kamgar | |
| 6,012,109 A | 1/2000 | Schultz | |
| 6,075,833 A | 6/2000 | Eshay et al. | |
| 6,480,942 B1 | 11/2002 | Hirairi | |
| 6,615,302 B1* | 9/2003 | Birns | H04L 49/901 |
| | | | 365/230.08 |
| 6,680,874 B1 | 1/2004 | Harrison | |
| 6,717,576 B1* | 4/2004 | Duluk, Jr. | G06T 15/30 |
| | | | 345/419 |
| 6,724,683 B2 | 4/2004 | Liao | |
| 6,725,388 B1 | 4/2004 | Susnow | |
| 6,956,776 B1 | 10/2005 | Lowe et al. | |
| 6,963,946 B1 | 11/2005 | Dwork et al. | |
| 7,009,618 B1* | 3/2006 | Brunner | G06F 12/063 |
| | | | 345/557 |
| 7,031,838 B1* | 4/2006 | Young | G06Q 10/06 |
| | | | 702/2 |
| 7,035,983 B1 | 4/2006 | Fensore | |
| 7,107,393 B1 | 9/2006 | Sabih | |
| 7,116,601 B2 | 10/2006 | Fung | |
| 7,234,645 B2* | 6/2007 | Silverbrook | B41J 2/16 |
| | | | 235/494 |
| 7,237,036 B2* | 6/2007 | Boucher | G06F 13/385 |
| | | | 370/396 |
| 7,570,534 B2 | 8/2009 | Wang et al. | |
| 7,630,361 B2* | 12/2009 | Chapman | H04L 12/2801 |
| | | | 370/467 |
| 7,672,332 B1* | 3/2010 | Chapman | H04L 12/2885 |
| | | | 370/468 |
| 7,860,084 B2* | 12/2010 | Binder | H04N 7/108 |
| | | | 370/352 |
| 8,036,214 B2* | 10/2011 | Elliott | H04L 65/1026 |
| | | | 370/522 |
| 8,327,187 B1* | 12/2012 | Metcalf | G06F 12/123 |
| | | | 714/10 |
| 8,707,370 B2* | 4/2014 | Carter | H04H 20/08 |
| | | | 725/39 |
| 8,848,725 B2* | 9/2014 | Binder | H04L 12/2838 |
| | | | 375/222 |
| 9,294,386 B2* | 3/2016 | Narad | H04L 45/16 |
| 9,432,298 B1* | 8/2016 | Smith | H04L 49/9057 |
| 9,736,071 B2* | 8/2017 | Ajanovic | H04L 47/10 |
| 10,409,524 B1 | 9/2019 | Branover | G06F 3/0634 |
| 10,462,627 B2* | 10/2019 | Raleigh | G06F 3/0482 |
| 10,630,606 B1* | 4/2020 | DiFerdinando | H04L 45/66 |
| 10,860,511 B1* | 12/2020 | Thompson | G06F 13/28 |
| 11,086,802 B1* | 8/2021 | Jalal | G06F 13/404 |
| 11,274,929 B1* | 3/2022 | Afrouzi | G05D 1/0272 |
| 2003/0154341 A1* | 8/2003 | Asaro | G06F 3/14 |
| | | | 710/306 |
| 2003/0165160 A1* | 9/2003 | Minami | H04L 69/161 |
| | | | 370/466 |
| 2004/0062267 A1* | 4/2004 | Minami | H04L 47/10 |
| | | | 370/463 |
| 2005/0125571 A1 | 6/2005 | Lin et al. | |
| 2005/0128846 A1 | 6/2005 | Momtaz et al. | |
| 2006/0277329 A1 | 12/2006 | Paulson et al. | |
| 2007/0011368 A1 | 1/2007 | Wang | |
| 2007/0220184 A1 | 9/2007 | Tierno | |
| 2007/0253430 A1* | 11/2007 | Minami | H04L 12/2898 |
| | | | 370/395.52 |
| 2008/0056192 A1* | 3/2008 | Strong | H04L 47/10 |
| | | | 370/331 |
| 2010/0005199 A1 | 1/2010 | Gadgil | |
| 2011/0187829 A1* | 8/2011 | Nakajima | H04N 13/20 |
| | | | 348/46 |
| 2012/0154375 A1* | 6/2012 | Zhang | G06F 9/4411 |
| | | | 345/419 |
| 2012/0253847 A1* | 10/2012 | Dell'Anno | G16H 40/67 |
| | | | 705/2 |
| 2013/0010617 A1* | 1/2013 | Chen | G01S 1/725 |
| | | | 370/252 |
| 2013/0054901 A1* | 2/2013 | Biswas | G06F 13/1642 |
| | | | 711/154 |
| 2013/0132854 A1* | 5/2013 | Raleigh | G06F 3/0482 |
| | | | 715/738 |
| 2013/0282807 A1* | 10/2013 | Rudy | G06F 13/385 |
| | | | 709/204 |
| 2014/0344488 A1* | 11/2014 | Flynn | G06F 13/00 |
| | | | 710/52 |
| 2015/0091927 A1* | 4/2015 | Cote | G06T 1/60 |
| | | | 345/547 |
| 2015/0178241 A1* | 6/2015 | Ajanovic | G06F 13/385 |
| | | | 710/29 |
| 2015/0281126 A1* | 10/2015 | Regula | H04L 67/26 |
| | | | 709/212 |
| 2015/0378737 A1* | 12/2015 | Debbage | G06F 12/0875 |
| | | | 712/225 |
| 2017/0024568 A1* | 1/2017 | Pappachan | G06F 21/64 |
| 2018/0113826 A1* | 4/2018 | Li | G06F 13/24 |
| 2018/0286112 A1* | 10/2018 | Lauritzen | G06T 15/405 |
| 2018/0293703 A1* | 10/2018 | Vaidyanathan | G06T 9/00 |
| 2018/0376171 A1* | 12/2018 | Dhandapani | G06F 3/048 |
| 2019/0004133 A1* | 1/2019 | Li | G01R 33/5611 |
| 2019/0081903 A1* | 3/2019 | Kobayashi | H04L 47/522 |
| 2019/0102859 A1* | 4/2019 | Hux | G06T 1/20 |
| 2019/0196745 A1* | 6/2019 | Persson | G06F 3/0659 |
| 2019/0205153 A1* | 7/2019 | Niestemski | G06F 9/45558 |
| 2019/0205244 A1* | 7/2019 | Smith | G06F 3/065 |
| 2019/0205736 A1* | 7/2019 | Bleiweiss | G06F 9/3887 |
| 2019/0373086 A1* | 12/2019 | Qi | H04L 49/20 |
| 2020/0045519 A1* | 2/2020 | Raleigh | H04M 15/765 |
| 2020/0125500 A1* | 4/2020 | Guan | G06F 12/1081 |
| 2021/0243129 A1* | 8/2021 | Sasu | H04L 47/2433 |
| 2022/0179805 A1* | 6/2022 | Hu | G06F 9/30079 |

OTHER PUBLICATIONS

Keller, James B., "The PWRficient Processor Family," PA Semi, Inc., Oct. 2005, 31 pages.

International Search Report and Written Opinion in International Application No. PCT/US2021/039190, mailed Oct. 28, 2021, 10 pages.

Office Action from Japanese Patent Application No. 2023-500423, dated Jan. 19, 2024, pp. 1-11.

\* cited by examiner

| Route Descriptor Field Name | Description |
|---|---|
| Is Producer? | Indicates Whether this Entry is Associated with a Producer |
| Last Frame Descriptor | Indicates Whether this is the Last Routing Descriptor for a Frame |
| Router ID | Identifier of the Producer Router |
| DMA ID | Identifier of the Producer DMA |
| Same Buffer Indicator | Indicates if this Frame Uses the Same Buffer as the Previous Frame |

FIG. 6

| Field Name | Description |
| --- | --- |
| Active | Indicates Whether the Entry is Actively Routing Credits |
| Is Producer? | Indicates Whether this Entry is Associated with a Producer |
| Local DMA ID | Identifier of the Local Credit Wire associated with this Entry |
| Destination Router ID | Identifier of the Remote Peer Router Table that the Credits are Sent to via a Fabric Write |
| Destination DMA ID | Identifier of the DMA Engine in the Destination Router |
| Route Manager ID | Identifier of the Route Manager that Initiated and Manages this Route The Lower Bits Identify the Route FIFO within the Manager |
| Buffer Write Pointer | Producer Write Pointer to the Location of the Next Credit to be Written into the Circular Buffer |
| Buffer Read Pointer | Pointer to the Next Credit to be Consumed by the Consumer |

FIG. 14

| Field Name | Description |
|---|---|
| Active | Indicates the Entry is Actively Routing Credits |
| Is Producer? | Indicates Whether this is Entry is Associated with a Producer |
| Local DMA ID | Identifier of the Local Credit Wire associated with this Entry |
| Destination Router ID | Identifier of the Remote Peer Router Table that the Credits are Sent to via a Fabric Write |
| Destination DMA ID | Identifier of the DMA in the Destination Router |
| Route Manager ID | Identifier of the Route Manager that Initiated and Manages this Route. The Lower Bits Identify the Route FIFO within the Manager |
| Buffer Read Pointer | Pointer to the Next Credit to be Consumed by the Consumer |
| Buffer Write Pointer | Producer Write Pointer to the Location of the Next Credit to be Written into the Circular Buffer |

FIG. 15

| Field Name | Description |
|---|---|
| Buffer Write Pointer | Producer Write Pointer to the Location of the Next Credit to be Written into the Circular Buffer |
| Buffer Read Pointer | Pointer to the Next Credit to be Consumed by the Consumer |
| Buffer Size | Size of the Circular Buffer in Credits |
| Frame Pointer | Points to the Next Credit in the Frame which the Producer DMA will Write to |
| Frame Size | The Total Frame Size in Credits including the Start/Mid/Done Increments |
| Frame Start Increment | The Number of Credits to Increment by at the Beginning of the Frame |
| Frame Middle Increment | The Number of Credits to Increment by in the Interior of the Frame |
| Frame Done Increment | The Number of Credits to Send to the Consumer when the Producer Frame is Done |
| Start Offset | The Value the Space-Available Credits Needs to Reach at the Beginning of a Frame Before Producing Data |
| Disable Remote | Setting this Bit Disables Remote Flow Control Messages to Support the NULL Connection Feature |

2005
Specify a Programmable Credit Skip Amount During Transfer of a Given Frame from a Producer DMA Engine to a Consumer DMA Engine

2010
Consume, by the Consumer DMA Engine, a Single Credit Worth of Data from a Buffer Location One or More Credits in Front of a Current Location of a Read Pointer

2015
Increment the Read Pointer by Multiple Credits in Response to Reading Only a Single Credit Worth of Data from the Buffer

2020
Send an Updated Read Pointer to the Producer DMA Engine

*FIG. 20*

SCATTER AND GATHER STREAMING DATA THROUGH A CIRCULAR FIFO

BACKGROUND

Technical Field

Embodiments described herein relate to the field of computing systems and, more particularly, to efficiently streaming data between multiple agents.

Description of the Related Art

Direct memory access (DMA) is a feature of computer systems that allows hardware subsystems to access system memory independently of the main processor (e.g., central processing unit (CPU)). The type of data being transferred in a DMA access can vary from embodiment to embodiment. One common type of data that is transferred in a computer system is image data, although the techniques described herein are not limited to the transfer of image data. The transferring of other types of data may also benefit from the improved methods and mechanisms disclosed in this specification. However, for the purposes of illustration, the transfer of image data will be used for many examples. These examples are merely illustrative and do not preclude the use of the described techniques with other types of data.

Computer systems (e.g., phones, tablets, laptops, desktops) often include or are connected to cameras or other image sensors for capturing image data such as video images or still pictures. Such image sensors may generate a stream of image data (commonly referred to as an "image data stream") that includes a series of individual pictures or frames. Each frame may include multiple lines of pixel data that specify a brightness and color of a given pixel. As used herein, the term "stream" is defined as a sequence of frames that will be undergoing any of a variety of types and amounts of processing.

Prior to displaying the image data stream on a monitor or other suitable display device, the data included in the image data stream may be processed in order to adjust color values, rotate or scale the image, and the like. To facilitate such processing, the image data stream may be stored in memory so that dedicated circuit blocks, such as a display processor, can operate on portions of a particular frame of the image data stream. In some cases, the display processor may also store the processed image data stream back into memory for future use.

In some computer systems, the display processor, or other circuit block used to process image data, may wait until a complete frame of the image data stream has been stored in memory before starting reading the stored data and commencing image processing operations. Waiting in such a manner may result in additional latency in the processing of the image data stream, or inefficient utilization of the memory.

SUMMARY

Systems, apparatuses, and methods for performing scatter and gather direct memory access (DMA) streaming through a circular first-in, first-out (FIFO) buffer are contemplated. In one embodiment, a system includes a FIFO buffer, a producer DMA engine, and a consumer DMA engine. After the producer DMA engine writes a given data chunk of a dataset (e.g., an image or video frame) to the buffer, the producer DMA engine sends an updated write pointer to the consumer DMA engine indicating that a data credit has been committed to the buffer and that the data credit is ready to be consumed. In some cases, multiple producer DMA engines are concurrently transferring separate sections of the dataset to the buffer. After the consumer DMA engine reads or skips over the given data chunk of the dataset from the buffer, the consumer DMA engine sends an updated read pointer to the producer DMA engine indicating that the data credit has been consumed and that space has been freed up in the buffer to be reused by the producer DMA engine. In some cases, multiple consumer DMA engines are concurrently consuming various regions of the dataset from the buffer.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which:

FIG. 6 is a table with route descriptor fields that may be used in accordance with one embodiment.

FIG. 14 is a table with fields of a producer route table entry in accordance with one embodiment.

FIG. 15 is a table with fields of a consumer route table entry in accordance with one embodiment.

FIG. 16 is a table with fields associated with a companion wrapper for a DMA engine in accordance with one embodiment.

FIG. 20 is a flow diagram of one embodiment of a method for advancing in a buffer by a programmable skip amount without consuming data credits.

Figure 1:
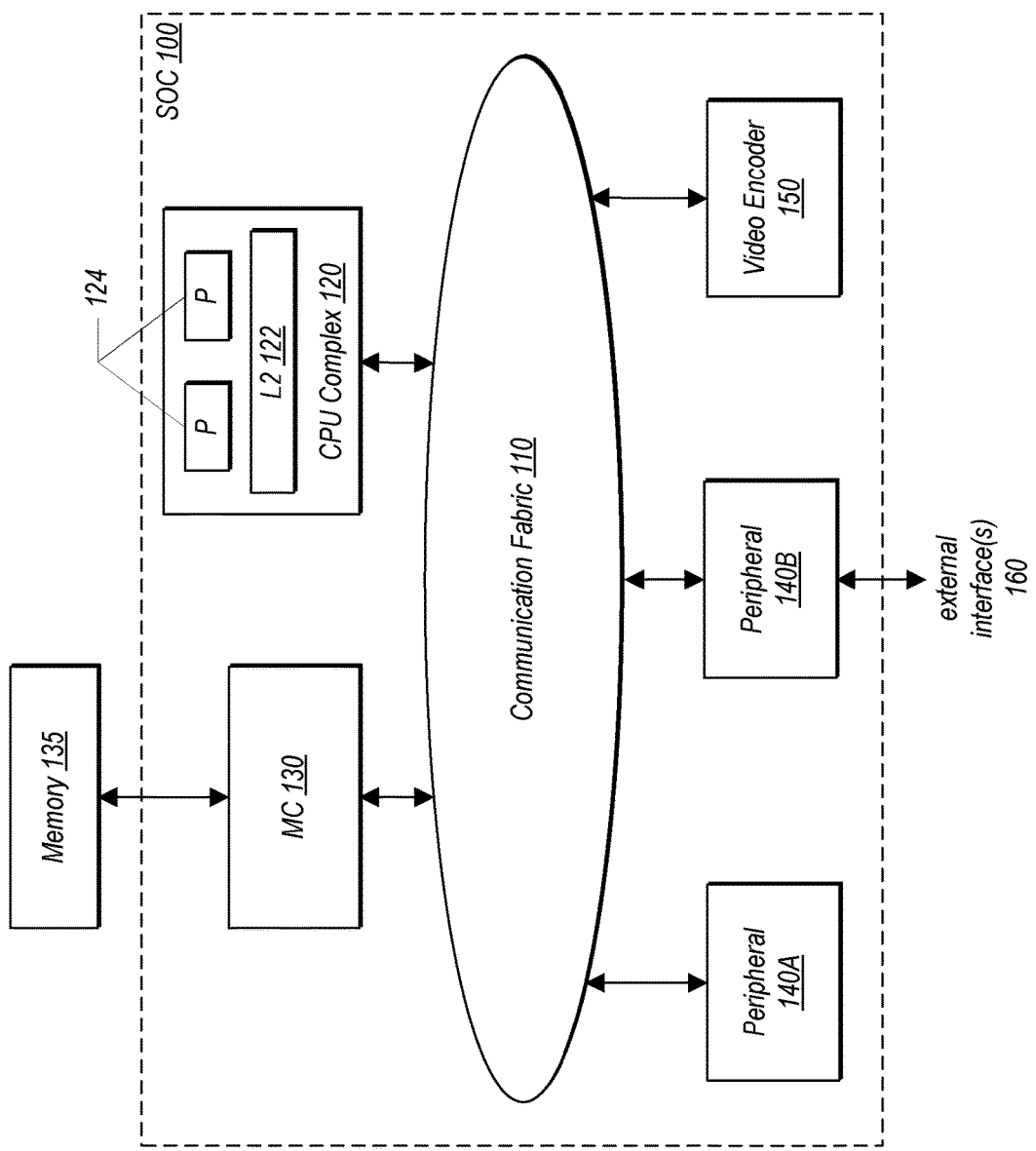
FIG. 1 is a generalized block diagram of one embodiment of a SOC.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Referring now to FIG. 1, a block diagram of one embodiment of a system-on-a-chip (SOC) 100 is shown. SOC 100 is shown coupled to a memory 135. As implied by the name, the components of the SOC 100 may be integrated onto a single semiconductor substrate as an integrated circuit "chip". In some embodiments, the components may be implemented on two or more discrete chips in a system. However, the SOC 100 will be used as an example herein. In the illustrated embodiment, the components of the SOC 100 include a central processing unit (CPU) complex 120, on-chip peripheral components 140A-140B (more briefly, "peripherals"), a memory controller (MC) 130, a video encoder 150 (which may itself be considered a peripheral component), and a communication fabric 110. The components 120, 130, 140A-140B, and 150 may all be coupled to the communication fabric 110. The memory controller 130 may be coupled to the memory 135 during use, and the peripheral 140B may be coupled to an external interface 160 during use. In the illustrated embodiment, the CPU complex 120 includes one or more processors (P) 124 and a level two (L2) cache 122.

The peripherals 140A-140B may be any set of additional hardware functionality included in the SOC 100. For example, the peripherals 140A-140B may include video peripherals such as an image signal processor configured to process image capture data from a camera or other image sensor, display controllers configured to display video data on one or more display devices, graphics processing units (GPUs), video encoder/decoders, scalers, rotators, blenders, etc. The peripherals may include audio peripherals such as microphones, speakers, interfaces to microphones and speakers, audio processors, digital signal processors, mixers, etc. The peripherals may include peripheral interface controllers for various interfaces 160 external to the SOC 100 (e.g. the peripheral 140B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

In one embodiment, SOC 100 may include at least one instance of a video encoder 150 component. Video encoder 150 may be an H.264 video encoder apparatus that may be configured to convert input video frames from an input format into H.264/Advanced Video Coding (AVC) format as described in the H.264/AVC standard. In one embodiment, SOC 100 includes CPU complex 120. The CPU complex 120 may include one or more CPU processors 124 that serve as the CPU of the SOC 100. The CPU of the system includes the processor(s) that execute the main control software of the system, such as an operating system. Generally, software executed by the CPU during use may control the other components of the system to realize the desired functionality of the system. The processors 124 may also execute other software, such as application programs. The application programs may provide user functionality, and may rely on the operating system for lower level device control. Accordingly, the processors 124 may also be referred to as application processors.

The CPU complex 120 may further include other hardware such as the L2 cache 122 and/or an interface to the other components of the system (e.g., an interface to the communication fabric 110). Generally, a processor may include any circuitry and/or microcode configured to execute instructions defined in an instruction set architecture implemented by the processor. The instructions and data operated on by the processors in response to executing the instructions may generally be stored in the memory 135, although certain instructions may be defined for direct processor access to peripherals as well. Processors may encompass processor cores implemented on an integrated circuit with other components as a system on a chip or other levels of integration. Processors may further encompass discrete microprocessors, processor cores, and/or microprocessors integrated into multichip module implementations, processors implemented as multiple integrated circuits, and so on.

The memory controller 130 may generally include the circuitry for receiving memory operations from the other components of the SOC 100 and for accessing the memory 135 to complete the memory operations. The memory controller 130 may be configured to access any type of memory 135. For example, the memory 135 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 130 may include queues for memory operations, for ordering (and potentially reordering) the operations and presenting the operations to the memory 135. The memory controller 130 may further include data buffers to store write data awaiting write to memory and read data awaiting return to the source of the memory operation.

The communication fabric 110 may be any communication interconnect and protocol for communicating among the components of the SOC 100. The communication fabric 110 may be bus-based, including shared bus configurations, cross bar configurations, and hierarchical buses with bridges. The communication fabric 110 may also be packet-based, and may be hierarchical with bridges, cross bar, point-to-point, or other interconnects. It is noted that the number of components of the SOC 100 (and the number of subcomponents for those shown in FIG. 1, such as within the CPU complex 120) may vary from embodiment to embodiment. There may be more or fewer of each component/subcomponent than the number shown in FIG. 1.

Figure 2:
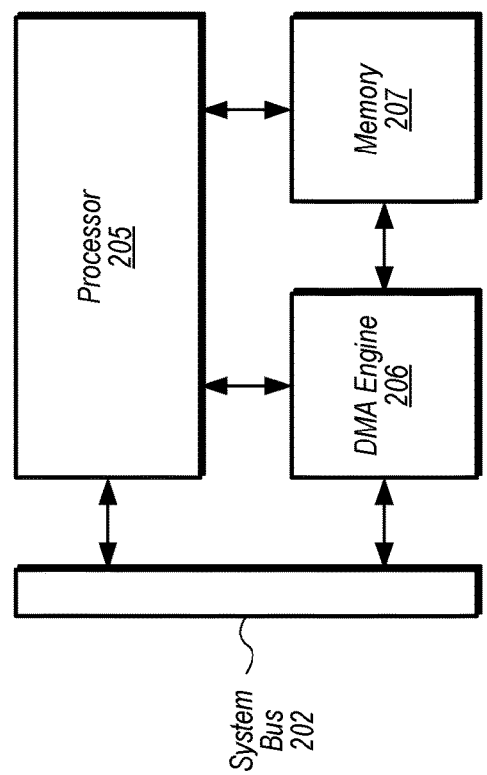
FIG. 2 is a generalized block diagram illustrating one embodiment of a data manager.

Turning to FIG. 2, an embodiment of a block diagram of a data manager 200 is illustrated. In the illustrated embodiment, data manager 200 includes processor 205, direct memory access (DMA) engine 206, and memory 207. Processor 205 and DMA engine 206 are coupled to system bus 202. Processor 205 may correspond to a general purpose processing core, similar to processors 124 in FIG. 1, which perform computational operations. For example, processor 205 may be a central processing unit (CPU), an application-specific integrated circuit (ASIC), a field-programmable gate array (FPGA), or other type of device. Alternatively, in another embodiment, processor 205 may correspond to video encoder 150 of FIG. 1. In various embodiments, processor 205 may implement any suitable instruction set architecture (ISA).

In one embodiment, DMA engine 206 is capable of transferring data from a source location to a destination location. The source and destination locations may be memory locations, such as, for example, memory 207 or memory block 135 in FIG. 1. In some embodiments, DMA engine 206 may be capable of performing scatter-gather or gather-scatter memory transfers. Scatter-gather refers to a memory transfer in which the source addresses are varied (e.g., "scattered") and the destination is a single address (e.g., "gathered"). Gather-scatter, accordingly, is the opposite. Processor 205 may program DMA engine 206 for one or more data transfers at a time.

In one embodiment, memory 207 includes a media command queue from which processor 205 retrieves media commands. In some embodiments, memory 207 may be implemented as Random Access Memory (RAM) and may also include program instructions for the operation of processor 205. In other embodiments, memory 207 may be a first-in, first-out (FIFO) buffer and may be reserved for use as the media command queue.

In one embodiment, processor 205 performs operations to manage a flow of data related to media, such as, for example, frames to be displayed, as the data is sent to various media agents before being sent to a display. In other embodiments, processor 205 manages the flow of other types of data. In one embodiment, processor 205 retrieves a first command from a media queue in memory 207 and determines, from the first command, a target media agent to execute the command. Based on the first command, processor 205 may setup DMA engine 206 to retrieve a first data set for a frame from another media agent or from a memory, such as memory 207. DMA engine 206 copies the first data set to the target media agent. Processor 205 sends the first command to the target media agent for execution. While the target media agent executes the first media command, processor 205 retrieves a second command from the media command queue in memory 207. The second command may correspond to a second data set for a second media agent, in which case, processor 205 sets DMA engine 206 to copy the second data set to the second media agent while the first command continues to be executed. This process may continue for any number of additional data sets and commands.

In one embodiment, DMA engine 206 is capable of operating in frame companion mode with one or more other DMA engines (not shown). As used herein, "frame companion mode" is defined as an operating mode in which the producer and consumer communicate the state of a shared circular buffer between each other so as to implement flow control. The state of the shared circular buffer may be captured by the values of a write pointer and a read pointer, and by the locations of the write pointer and the read pointer in relation to each other. In one embodiment, the shared circular buffer is smaller than a full frame being transferred between the producer and the consumer. Frame companion mode supports the ability of the consumer to know when a credits worth of data has been produced, and frame companion mode supports the ability for the producer to be back-pressured when there is not enough space available in the buffer. Additionally, frame companion mode supports the ability of the consumer to read a region of data in random order and then increment the read pointer if the data associated with skipped over write credits is no longer needed. This feature enables the support of a warper read DMA engine that reads tiles according to a configurable mesh.

It is noted that the embodiment of data manager 200 as illustrated in FIG. 2 is merely an example. The illustration of FIG. 2 has been simplified to highlight features relevant to this disclosure. Various embodiments may include different configurations of the functional blocks, including additional blocks.

Figure 3:
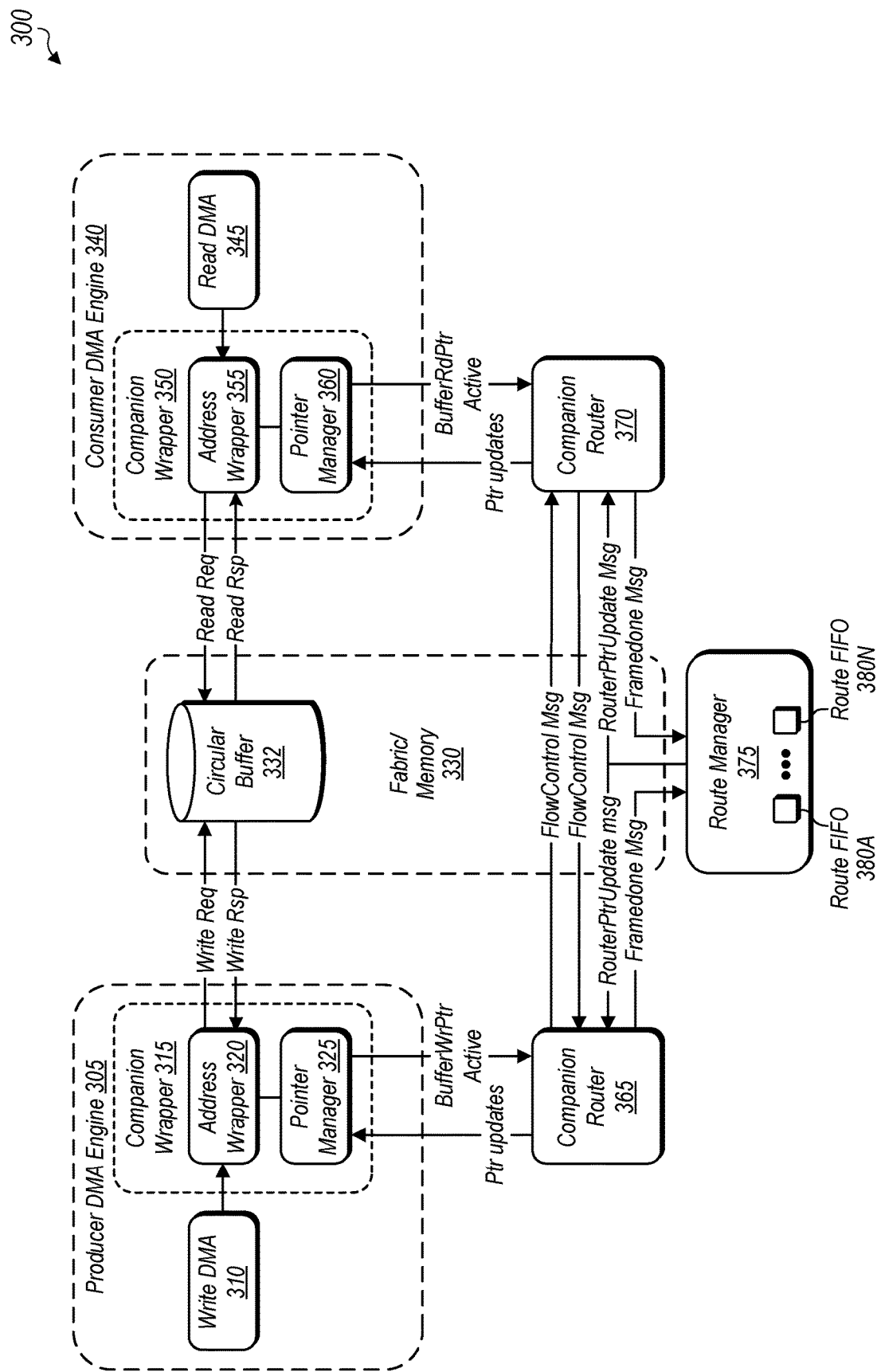
FIG. 3 is a block diagram of one embodiment of a remote companion DMA system.

Referring now to FIG. 3, a block diagram of one embodiment of a remote companion DMA system 300 is shown. The remote companion DMA system 300 illustrates the connections and components of a system where the producer DMA engine 305 and the consumer DMA engine 340 communicate remotely. This companion DMA system 300 may be referred to as a "remote" system since the producer DMA engine 305 does not have a direct connection with the consumer DMA engine 340. It is noted that companion DMA system 300 is one example of a remote companion DMA system in accordance with one embodiment. In other embodiments, other types of remote companion DMA systems with other types of components, other connections, and other suitable structures may be employed.

In one embodiment, pointers are exchanged between the DMA engines 305 and 340 using fabric write requests that are routed between the DMA engines. These pointer exchanges result in virtualizing the wires between the producer and consumer engines. Companion routers 365 and 370 are responsible for routing of flow control information to the DMA engines 305 and 340. In one embodiment, companion routers 365 and 370 route the flow control pointers between the producer and consumer DMA engines using information stored in a router table entry. Companion routers 365 and 370 are also responsible for handling the multi-producer merge and multi-consumer broadcast functionality in systems with multiple producers and/or multiple consumers. For example, in one embodiment, a companion router merges updates from a plurality of producer DMA engines together into a single, updated write pointer. In another embodiment, a companion router merges updates from a plurality of consumer DMA engines together into a single, updated read pointer.

In one implementation, companion router 365 includes control logic and a routing table of entries for producer DMA engine 305. Similarly, companion router 370 includes control logic and a routing table of entries for consumer DMA engine 340. The routing table in each router is used by the router to exchange pointer updates with remote routers.

In one implementation, route manager 375 manages the initialization and updating of the routing tables in the local routers 365 and 370. As used herein, the term "route manager" is defined as a control unit (implemented using any suitable combination of software and/or hardware) which manages the route FIFOs 380A-N and the initialization of the routes in the routers. There can be more than one route manager in the system, and these route managers can manage the routes for any companion routers in the system. Route FIFOs 380A-N are representative of any number of route FIFOs managed by route manager 375. As used herein, the term "route FIFO" is defined as a FIFO queue of route descriptors that specify a serial sequence of frames in a stream. In some embodiments, route manager 375 is over-provisioned with route FIFOs 380A-N in case one of the other subsystems with a route FIFO is powered down. It is noted that the terms "route FIFO" and "route descriptor queue" may be used interchangeably herein.

Software executing on a processor (e.g., processors 124 of FIG. 1) schedules frames by pushing route descriptors into the appropriate route FIFOs of the route manager 375. As used herein, the term "route descriptor" is defined as a field that specifies how to route flow control information between the producer and the consumer. Each companion DMA subsystem has a producer route descriptor in each producer DMA and a consumer route descriptor in each consumer DMA. At a minimum, there is one producer route descriptor and one consumer route descriptor per companion DMA subsystem, but in general there can be any number of producer route descriptors and consumer route descriptors. Also, while there is a 1:1 mapping from companion wrapper to DMA unit, there can be multiple companion wrappers for each companion router.

In one embodiment, the route manager 375 pops the route descriptors off the route FIFOs and initializes the route entries in the corresponding routers 365 and 370. As used herein, the term "route entry" is defined as the active state of the flow control information in flight as well as a copy of the route descriptor. It is noted that the terms "route entry" and "route table entry" may be used interchangeably herein. The route manager 375 also receives frame done messages from the routers 365 and 370. The frame done messages are used for scheduling the descriptors of the next frame as well as for initializing the pointers in the route entries to handle frame overlap when the producer(s) have moved onto the next frame while consumer(s) are finishing up the current frame.

Producer DMA engine 305 includes at least write DMA unit 310 and companion wrapper 315. As used herein, a "producer DMA engine" is defined as a write DMA channel that is writing data to a buffer in memory. A "producer DMA engine" may also be referred to herein as a "producer" for short. Companion wrapper 315 includes address wrapper 320 and pointer manager 325. Address wrapper 320 manages the data writes to circular buffer 332 as well as the address wrap around case for circular buffer 332. Address wrapper 320 generates write requests (i.e., data writes) which are sent to circular buffer 332 within fabric and memory subsystem 330, and address wrapper 320 receives responses to the write requests from circular buffer 332. Pointer manager 325 manages the flow control between producer DMA engine 305 and consumer DMA engine 320 via the local and remote pointers.

Consumer DMA engine 340 includes at least read DMA unit 345 and companion wrapper 350 which includes address wrapper 355 and pointer manager 360. As used herein, a "consumer DMA engine" is defined as a read DMA channel that is reading data from a buffer in memory. A "consumer DMA engine" may also be referred to herein as a "consumer" for short. Companion wrapper 350 manages the flow control for the DMA channel. When write DMA engine 310 finishes writing a data chunk to buffer 332, pointer manager 325 sends a buffer write pointer update to companion router 365. This update flows through companion router 370 to pointer manager 360. The buffer write pointer update indicates that a data credit has been committed to buffer 332 and is ready to be consumed. The size of the data chunk which corresponds to a data credit may vary according to the embodiment. In one embodiment, the size of the data chunk is measured in terms of bytes of data. In another embodiment, the size of the data chunk is measured in terms of lines of a frame. In a further embodiment, the size of the data chunk is measured in terms of tiles or blocks of a frame.

When read DMA unit 345 consumes the data credit, pointer manager 360 sends a buffer read pointer update to companion router 370 indicating that the data credit has been consumed and space has been freed up in buffer 332 to be reused by DMA producer engine 305. The buffer read pointer update continues on through companion router 365 to pointer manager 325.

In one embodiment, buffer 332 is a circular buffer. In other embodiments, buffer 330 is other types of buffers. It is noted that buffer 332 supports random access by the producer and consumer to the chunks of data stored in buffer 332. This allows the order of data production and consumption to be random. On the other hand, pointer updates are sequential but can often skip ahead by multiple increments. In one embodiment, buffer 330 is treated as FIFO where a producer pushes credits worth of data into the buffer with an incrementing write pointer. The consumer consumes a credits worth of data from the buffer with an incrementing read pointer. The pointer addresses wrap with the size of the circular buffer. The pointer can increment by either an actual data access (read/write) or the pointer can increment when a credit is skipped over. As used herein, the term "credit" is defined as a unit of flow control between the producer and the consumer. Depending on the embodiment, a credit can be measured in terms of a number of bytes of data, number of lines of uncompressed frame data, a strip of frame data, a tile row for tile data such as compressed data, or otherwise. The circular buffer read and write pointers used for flow control are adjusted in units of credits. The parameter "SA-credits" measures the space available in the circular buffer in units of credits, and the parameter "DA-credits" measures the data available in the circular buffer in units of credits.

In one embodiment, the buffer write pointer points to the next location in the circular buffer where the producer will produce a credits worth of data. Production of data is either writing the data or not writing the data in the case of skipping a credit. In one embodiment, the buffer read pointer is the next location in the circular buffer where the consumer will consume a credits worth of data. Consumption of data signifies that the consumer is done with the data regardless of whether the consumer actually read the data or merely skipped over the data.

Figure 4:
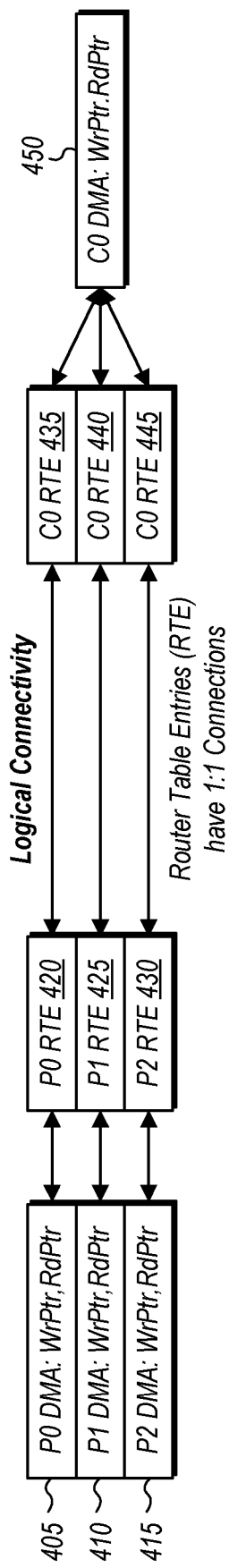
FIG. 4 is a block diagram of one embodiment of the logical connectivity between producer and consumer router table entries.

Turning now to FIG. 4, a block diagram of one embodiment of the logical connectivity between producer and consumer router table entries (RTE) is shown. In some embodiments, there may be multiple producers supplying data to a single or multiple consumers. In the embodiment illustrated in FIG. 4, there are three producers feeding a single consumer. The three producer DMA engines 405, 410, and 415 are shown on the left side of FIG. 4. Each producer DMA engine 405, 410, and 415 has a corresponding RTE entry 420, 425, and 430, respectively. Each producer RTE 420, 425, and 430 has a logical connection with a corresponding consumer RTE 435, 440, and 445, respectively. The consumer RTE's 435, 440, and 445 allow data to be transferred from corresponding producers back to consumer DMA engine 450. It should be understood that other embodiments may have other numbers of logical connections between RTE's for other numbers of producers and/or consumers.

Figure 5:
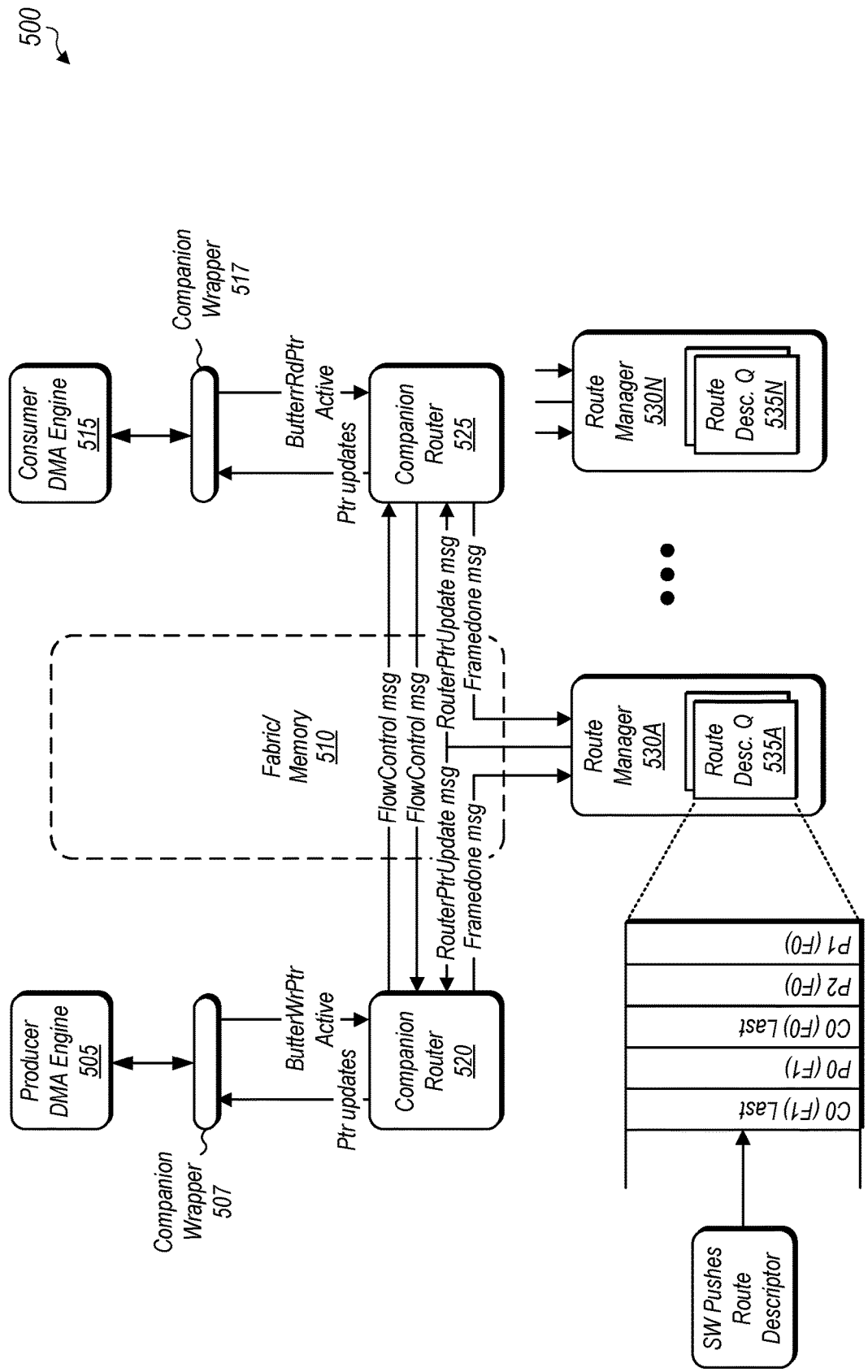
FIG. 5 is a block diagram of another embodiment of a remote companion DMA system.

Turning now to FIG. 5, a block diagram of another embodiment of a remote companion DMA system 500 is shown. DMA system 500 includes producer DMA engine 505, companion wrapper 507, fabric and memory subsystem 510, consumer DMA engine 515, companion wrapper 517, companion routers 520 and 525, and route managers 530A-N. Each route manager 530A-N includes one or more corresponding route descriptor queues (Desc. Q) 535A-N. It is noted that route managers 530A-N may be referred to collectively as a route manager. Depending on the embodiment, a single route manager or multiple route managers may manage multiple route descriptor queues 535A-N. An example of a route descriptor queue is shown in expanded form from the dashed lines connected to route descriptor queue 535A. Route descriptors are labeled with a producer identifier (ID) (e.g., P1, P2), a frame ID (e.g., F0, F1), and an indication if the descriptor is the last descriptor for the frame. It should be understood that this example of route descriptor queue 535A is merely one example of a route descriptor queue and descriptors stored therein. Other types of descriptors may be used in other embodiments.

In one embodiment, route managers 530A-N support multiple streams of frames concurrently via the multiple route descriptor queues 535A-N, with one route descriptor queue for each stream. The frames of a stream are scheduled by software pushing a route descriptor into the corresponding route descriptor queue. When a single frame involves multiple DMAs, the software pushes a separate route descriptor for each DMA participating in the frame. In one embodiment, if there is space in a route descriptor queue as indicated by an occupancy register (not shown), the software pushes route descriptors associated with a frame into the desired route descriptor queue by writing to the appropriate register. In one embodiment, a low watermark threshold register stores a threshold value. When the number of entries in the corresponding route descriptor queue drops below the threshold value, an interrupt is generated for software indicating that there is space in the route descriptor queue.

In one embodiment, the descriptors for a frame are grouped together with the last descriptor in the group having a last bit set indicating to the route manager that there is a full frames worth of descriptors in the route descriptor queue. When the previous frame is finished, the route manager pops the next frames worth of route descriptors off of the head of the route descriptor queue and sends corresponding update messages to the appropriate router. When the route table entries in the routers are initialized by the route manager, the routers get updates from the local DMAs and then route flow control messages to other routers. When a DMA engine finishes a frame, the DMA engine notifies the companion wrapper which in turn notifies the router. In response to receiving the notification that the DMA engine has finished the frame, the router sends a corresponding frame completion message to the route manager. The route manager then continues on to the next frame.

In one embodiment, DMA system 500 is able to accommodate the transfer of multi-plane frames. In this embodiment, each plane of a multi-plane frame is treated as a separate companion DMA with its own credits and peers. Also, in one embodiment, frame overlap is supported by DMA system 500. Frame overlap allows producer DMA engine 505 to start processing the next (N+1) frame while consumer DMA engine 515 is still reading the current (N) frame. In one embodiment, the overlapping frames have the same bytes per credit. However, the overlapping frames may have different numbers of credits per frame. In other words, the overlapping frames may have different frame sizes. In one embodiment, overlapping frames are associated with the same route descriptor queue.

In another embodiment, DMA system 500 supports a single producer supplying multiple consumers in a broadcast fashion. In a further embodiment, DMA system 500 supports multiple producers supplying one consumer for superframes or for a multiplex scenario. In one embodiment, multiple frame producers are concatenated both horizontally and vertically. Also, the super frame content may vary from frame to frame. Also, in a still further embodiment, DMA system 500 supports many producers supplying many consumers through a single super frame. A producer may write a region of any size and alignment within a consumed frame. Similarly, a consumer may read a region of any size and alignment within a produced frame.

Turning now to FIG. 6, a table 600 with route descriptor fields that may be used in accordance with one embodiment is shown. Table 600 includes examples of route descriptor fields that may be included within route descriptors that are pushed into a route descriptor queue (e.g., route descriptor queue 535A of FIG. 5). For example, field 605 indicates whether the route descriptor entry is associated with a producer. In one embodiment, field 605 is a single bit with a 1 indicating that the entry is associated with a producer and a 0 indicating that the entry is associated with a consumer. Last field descriptor field 610 indicates whether this descriptor is the last routing descriptor for a given frame. Router ID field 615 identifies the producer router and DMA ID field 620 identifies the producer DMA engine. Same buffer indicator 625 indicates if this frame uses the same buffer as the previous frame. It should be understood that table 600 is representative of the route descriptor fields that may be used in one particular embodiment. In other embodiments, other route descriptor fields may be defined for the route descriptor queue entries.

Figure 7:
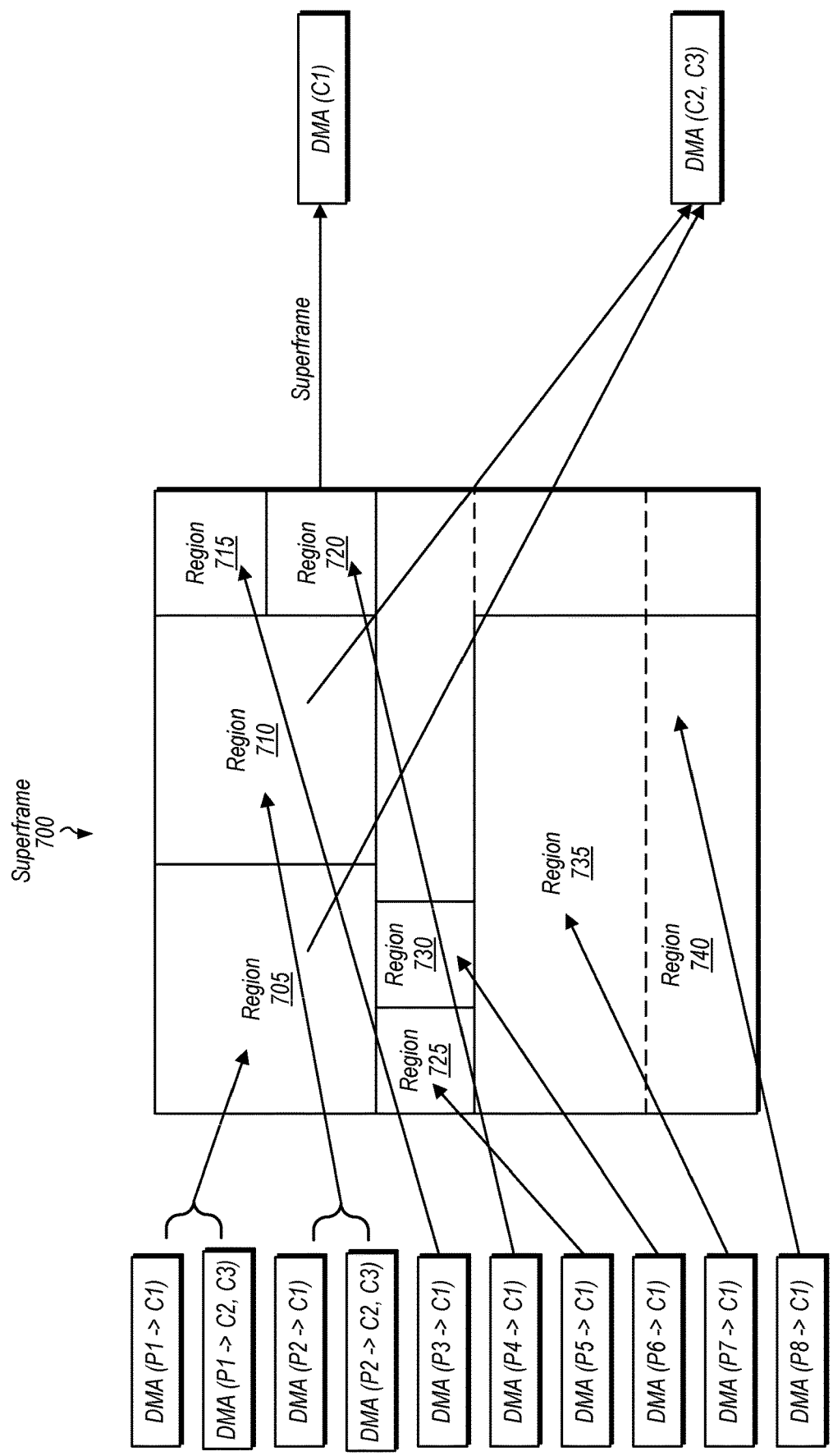
FIG. 7 is a diagram of one embodiment of a superframe being produced by multiple producers and consumed by multiple consumers.

Referring now to FIG. 7, a diagram of one embodiment of a superframe 700 being produced by multiple producers and consumed by multiple consumers is shown. In one embodiment, superframe 700 is generated and transferred by multiple DMA producers P1-P9 and consumed by multiple DMA consumers C1-C3. The relationships between regions and producers and consumers are indicated via the arrows in between the producer and consumer blocks and the respective regions. For example, DMA producers P1 and P2 transfer regions 705 and 710, respectively, to DMA consumers C1-C3. Also, DMA producers P3 and P4 transfer regions 715 and 720, respectively, to DMA consumer C1. Additionally, DMA producers P5, P6, P7, and P8 transfer regions 725, 730, 735, and 740, respectively, to DMA consumer C1.

It should be understood that superframe 700 and the arrangement of producers and consumers shown in FIG. 7 is merely indicative of one particular embodiment. In other embodiments, superframe 700 may have other configurations of regions, other numbers of producers may generate the different regions, and/or other numbers of consumers may consume the different regions. For example, the size and shape of regions within a superframe may differ from what is shown in FIG. 7, with the size, shape, and number of regions varying according to the embodiment.

Figure 8:
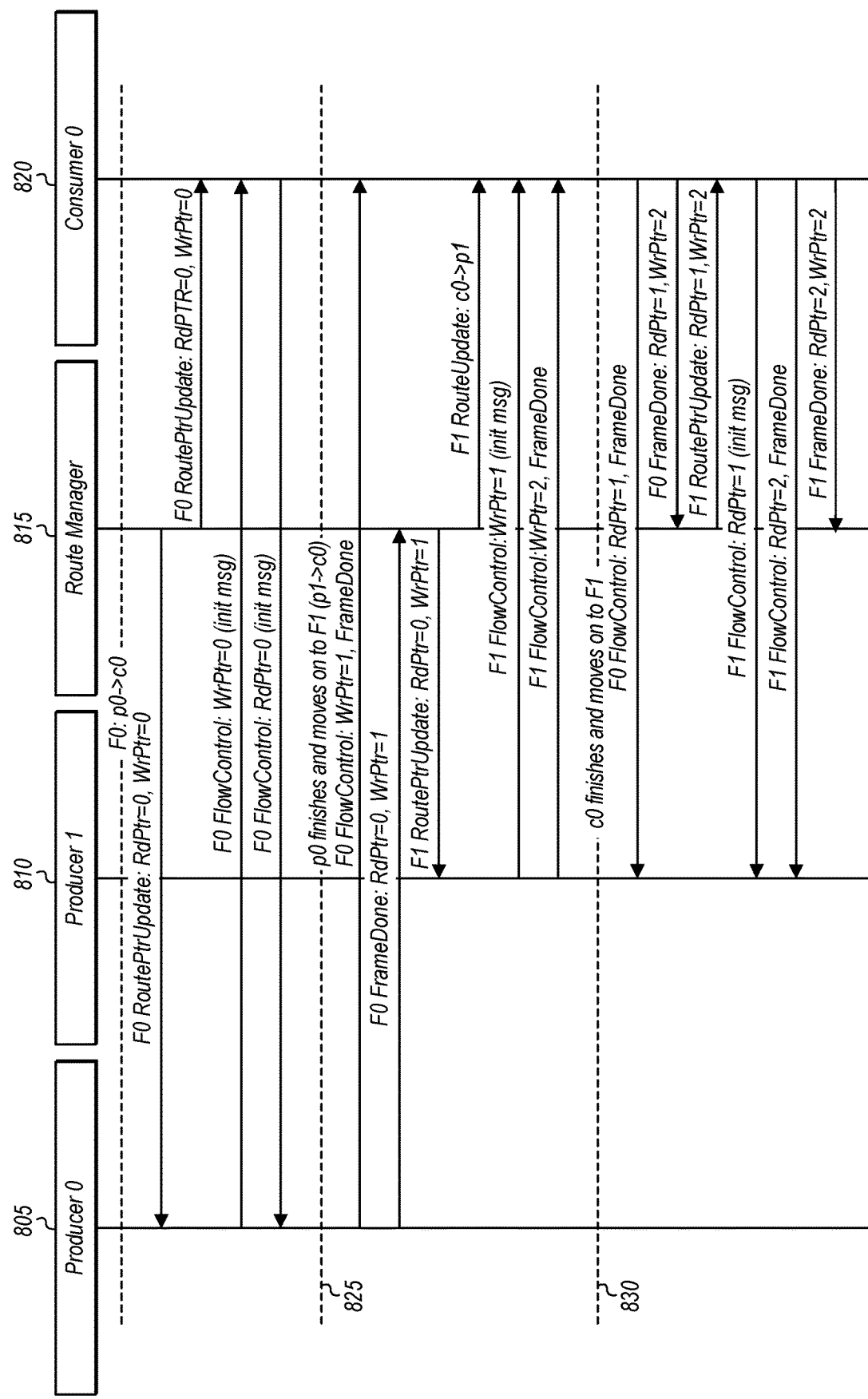
FIG. 8 is a timing diagram of one embodiment of a companion DMA system.

Turning now to FIG. 8, one embodiment of a timing diagram 800 of a companion DMA system is shown. Timing diagram 800 illustrates one example of a sequence of events for a companion DMA system having two producers and one consumer. The rectangular blocks 805, 810, 815, and 820 at the top of timing diagram 800 represent producer 0, producer 1, a route manager, and consumer 0. For the transfer of frame 0 (or F0), producer 0 is transferring frame 0 to consumer 0. The transfer process begins with the route manager sending route pointer updates to producer 0 and consumer 0 at the start of the frame. Then a flow control initialization message is sent from producer 0 to consumer 0 with the write pointer value, and a flow control initialization message is sent from consumer 0 to producer 0 with the read pointer value. Dashed line 825 indicates when producer 0 finishes transferring frame 0, which is confirmed by producer 0 sending frame done messages to consumer 0 and the route manager.

It is assumed for the purposes of this discussion that producer 1 transfers frame 1 to consumer 0. Consumer 0 may still be consuming frame 0 when the transfer of frame 1 commences. The route manager sends a route pointer update to producer 1, and the route manager sends a route update for frame 1 to consumer 0. Producer 1 sends an initialization message to consumer 0 and then transfers frame 1 to the buffer. When transfer of frame 1 is complete, producer 1 sends a frame done message to consumer 0. The dashed line labeled 830 indicates when consumer 0 finishes consuming frame 0 and moves on to frame 1. Consumer 0 sends a frame done message to producer 1 and to the route manager. Then, consumer 0 receives a router pointer update for frame 1 from the route manager. Consumer 0 sends an initialization message to producer 1 and then consumer 0 starts consuming frame 1. When consumption of frame 1 is completed, consumer 0 sends frame done messages to producer 1 and to the route manager.

Figure 9:
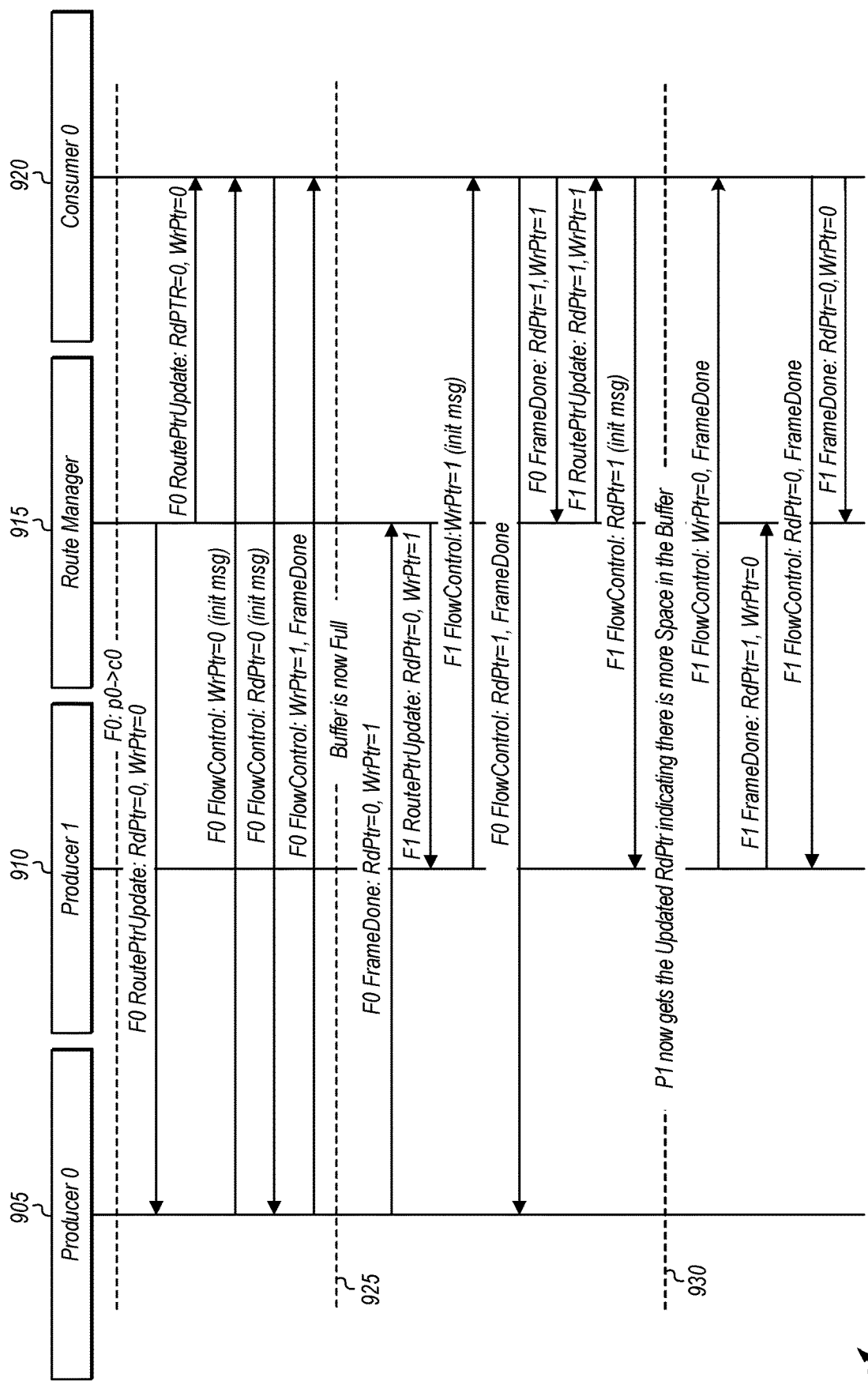
FIG. 9 is a timing diagram of one embodiment of the operation of a companion DMA system.

Referring now to FIG. 9, a timing diagram 900 of one embodiment of the operation of a companion DMA system is shown. Timing diagram 900 illustrates the sequence of events for a companion DMA system with two producers 905 and 910, route manager 915, and consumer 920. Producers 905 and 910 are also referred to as producers 0 and 1, respectively, or as P0 and P1. Consumer 920 is also referred to as consumer 0 or C0 in diagram 900. Frame 0 (or F0) is sent from producer 0 to consumer 0. At the beginning of frame 0, route manager 915 sends a route pointer update to producer 0 and consumer 0. Then, flow control messages are exchanged between producer 0 and consumer 0 to provide updated write pointer and read pointer values. When producer 0 has finished writing frame 0 to the buffer, frame done messages are sent to consumer 0 and route manager 915 with write pointer updates. The dashed line 925 indicates when the buffer is full.

It is assumed for the purposes of this discussion that producer 1 will be sending frame 1 to consumer 0. Accordingly, after route manager 915 receives the frame done message from producer 0 for frame 0, route manager 915 sends a route pointer update for frame 1 to producer 1. Then, producer 1 sends a flow control update for frame 1 to consumer 0. At this point in time, consumer 0 is still consuming the data of frame 0 from the buffer, and producer 1 has not received updated read pointer values from consumer 0 because consumer 0 is sending these updates to producer 0. When consumer 0 has finished consuming frame 0 from the buffer, consumer 0 sends frame done messages to producer 0 and route manager 915. Then, consumer 0 sends a flow control message for frame 1 to producer 1 with an updated read pointer value. This flow control message allows consumer 0 to communicate its starting state to producer 1.

Dashed line 930 represents the point in time when producer 1 receives the updated read pointer value indicating that there is more space available in the buffer for writing the data of frame 1. When producer 1 finishes writing the entirety of frame 1 to the buffer, producer 1 sends frame done messages to consumer 0 and route manager 915. When consumer 0 finishes consuming the entirety of frame 1 from the buffer, consumer 0 sends frame done messages to producer 1 and route manager 915.

Figure 10:
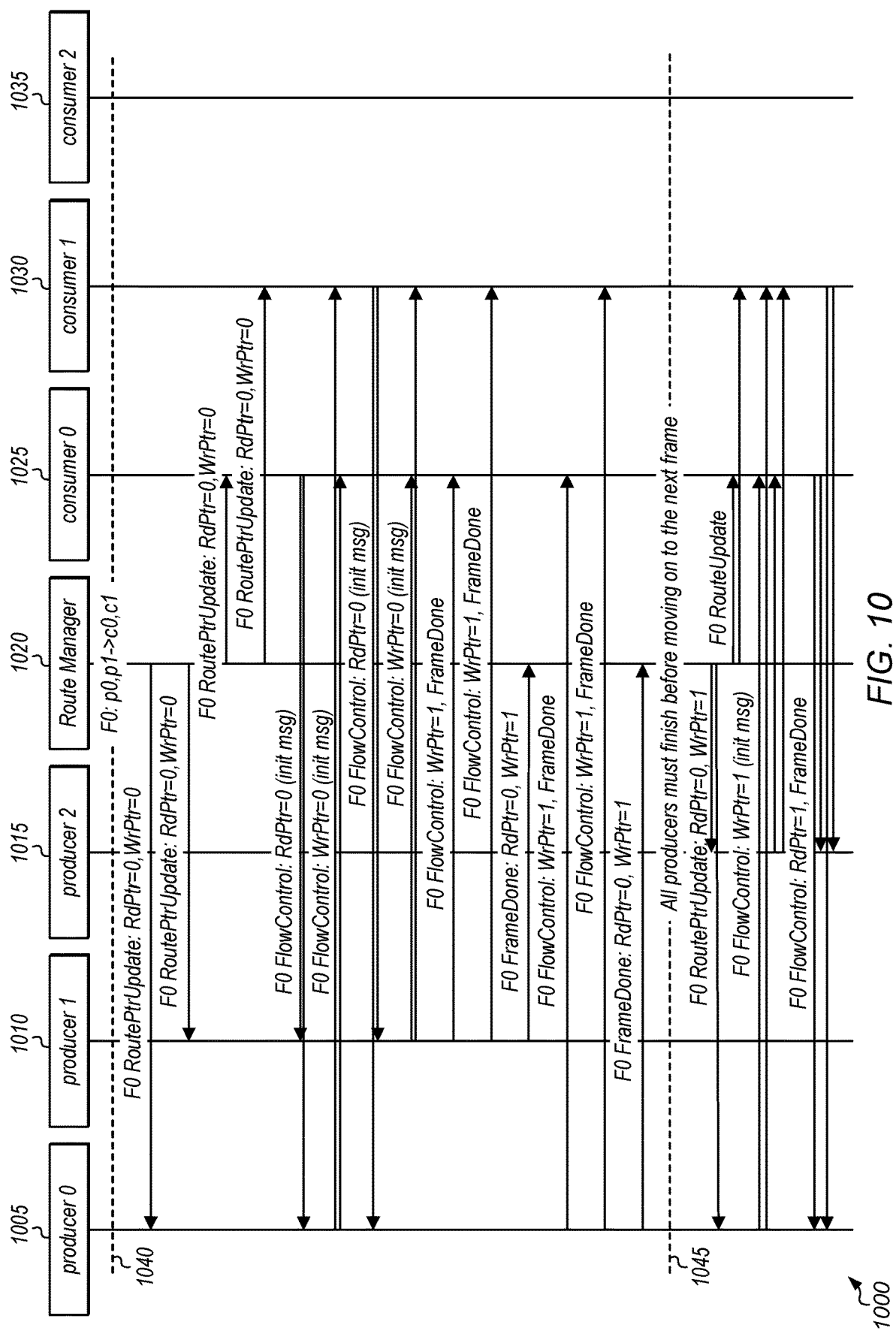
FIG. 10 is a timing diagram of one embodiment of a companion DMA system with multiple producers and multiple consumers.

Turning now to FIG. 10, a timing diagram 1000 of one embodiment of a companion DMA system with multiple producers and multiple consumers is shown. Timing diagram 1000 illustrates the sequence of events for a companion DMA system with three producers 1005, 1010, and 1015, route manager 1020, and three consumers 1025, 1030, and 1035. Producers 1005, 1010, and 1015 are also referred to as producers 0, 1, and 2, respectively, or as P0, P1, or P2. Consumers 1025, 1030, and 1035 are also referred to as consumers 0, 1, and 2, respectively, or as C0, C1, and C2 in diagram 1000. Frame 0 (or F0) is sent from producers 0 and 1 to consumers 0 and 1. The initiation of the transfer of frame 0 is indicated by dashed line 1040. At the beginning of frame 0, route manager 1015 sends route pointer and read and write pointer updates to producers 0 and 1 and to consumers 0 and 1. Then, flow control messages are exchanged between producers 0 and 1 and consumers 0 and 1 to provide updated write pointer and read pointer values. When producers 0 and 1 have finished writing frame 0 to the buffer, frame done messages are sent to consumers 0 and 1 and route manager 1015 with write pointer updates. The dashed line 1045 indicates when the producers can move onto the next frame (i.e., frame 1) after all producers have finished transferring their respective portions of frame 0. After dashed line 1045, an intermediate route is created between producers 0 and 2 to consumers 0 and 1 since producers 0 and 2 are on frame 1 and consumers 0 and 1 are still on frame 0. This allows producers 0 and 2 and consumers 0 and 1 to continue to exchange credits. The intermediate route has flow control messages being exchanged between producers and consumers even though they are on different frames. When consumers 0 and 1 finish consuming frame 0 from the buffer, consumers 0 and 1 send frame done messages with read pointer updates to producers 0 and 2. It is noted that the discussion of FIG. 10 will continue on to the discussion of FIG. 11.

Figure 11:
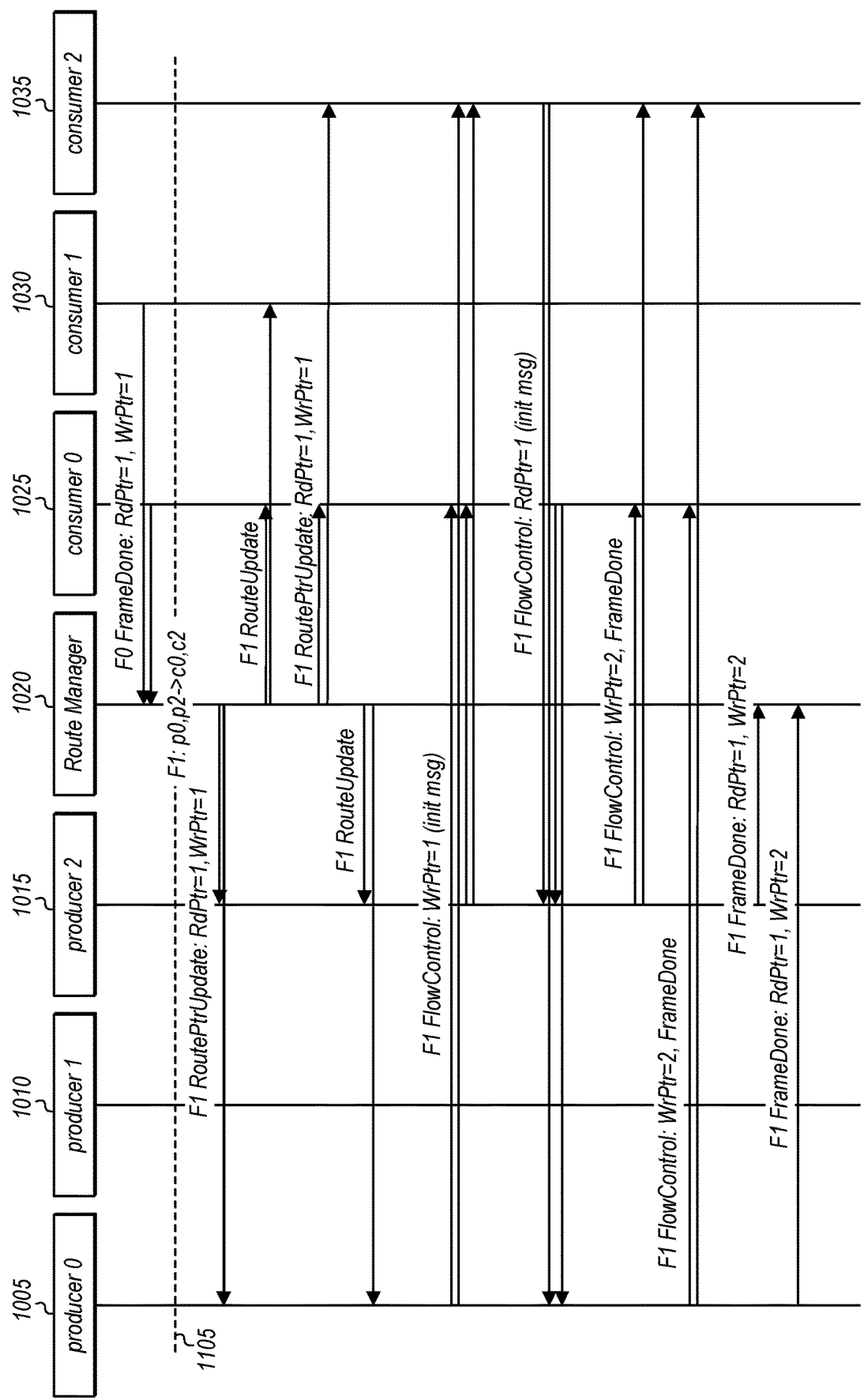
FIG. 11 is a timing diagram of one embodiment of a companion DMA system with multiple producers and multiple consumers.

Referring now to FIG. 11, a timing diagram 1100 of one embodiment of a companion DMA system with multiple producers and multiple consumers is shown. The companion DMA system with three producers 1005, 1010, and 1015, route manager 1020, and three consumers 1025, 1030, and 1035 shown in FIG. 11 is intended to represent the same companion DMA system shown in FIG. 10. Accordingly, timing diagram 1100 is a continuation of the sequence of events that are shown in timing diagram 1000 (of FIG. 10). At the top of timing diagram 1100, consumers 0 and 1 send frame done messages with read pointer updates to route manager 1020 after consumers 0 and 1 have finished consuming the frame 0 data from the buffer.

Dashed line 1105 represents the start of the consumption of frame 1. It is assumed for the purposes of this discussion that producers 0 and 2 are transferring frame 1 to consumers 0 and 2. Accordingly, at the start of frame 1, route manager 1020 sends route pointer updates for frame 1 to producers 0 and 2 and route manager 1020 sends route updates for frame 1 to consumers 0 and 1. Then, route manager 1020 sends route pointer updates for frame 1 to consumers 0 and 2. The route pointer updates sent by route manager 1020 also include indications of the write pointer and read pointer values. Also, route manager 1020 sends route updates for frame 1 to producers 0 and 2. During transfer of frame 1, flow control messages are exchanged between producers 0 and 2 and consumers 0 and 2. These flow control messages include write pointer updates or read pointer updates. Then, when the entirety of frame 1 has been transferred to the buffer, producers 0 and 2 send frame done messages to consumers 0 and 2 and to route manager 1020. It is noted that additional messages can be sent when consumers 0 and 2 finish consuming the data of frame 1 although these messages are not shown in timing diagram 1100. Also, subsequent frames can involve a similar exchange of messages as is shown for frames 0 and 1 in timing diagrams 1000 and 1100.

Timing diagrams 1000 and 1100 illustrate the exchange of pointers between producers and consumers in accordance with one embodiment. One benefit of using pointers is that producer pointers can be sent to consumers that have not yet started. These consumers can drop the flow control messages, and the dropped flow control messages are handled as future write pointer updates from the producer that arrive at the consumer whenever the consumer is configured, including at a point in time after the producer has completely finished the frame.

Figure 12:
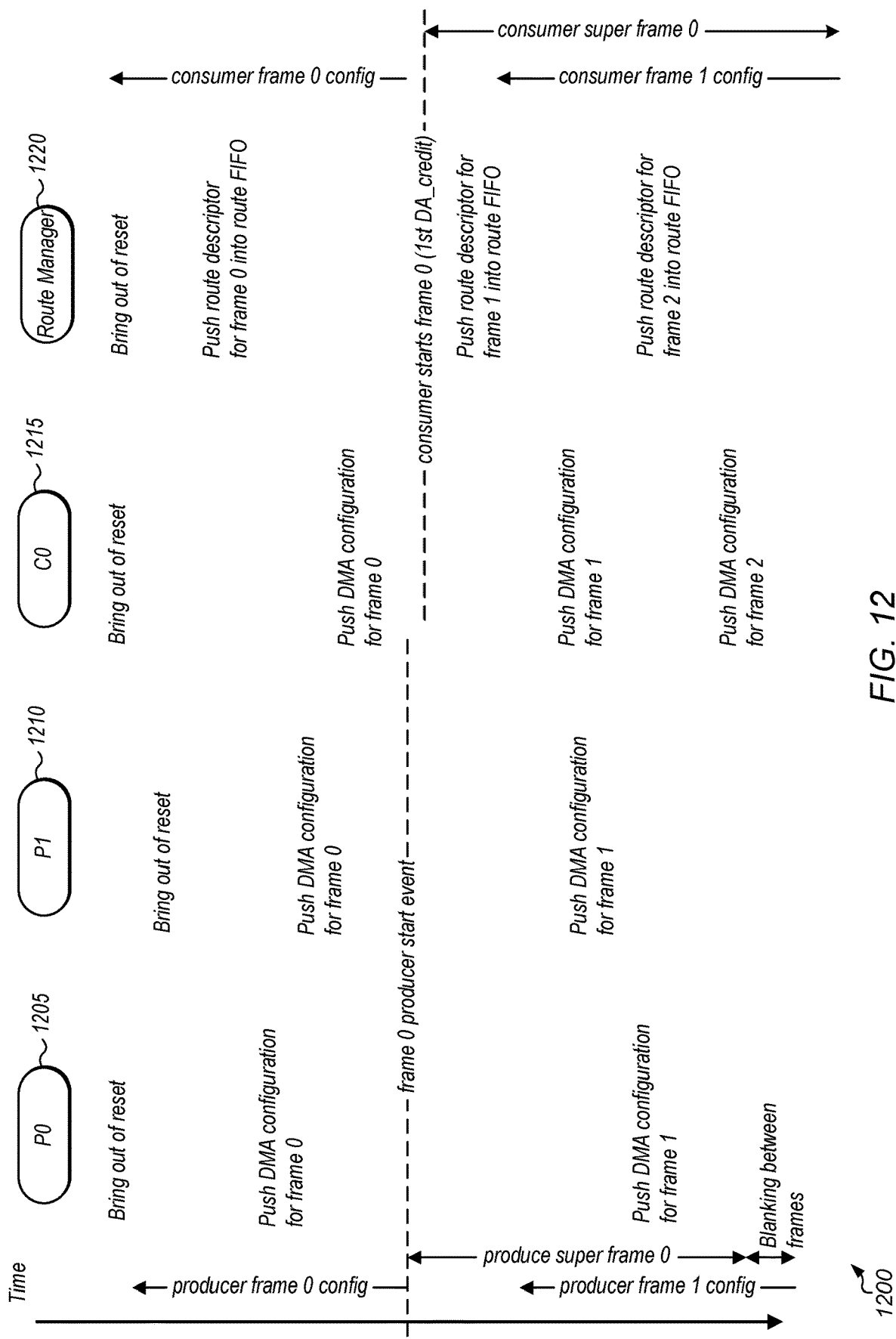
FIG. 12 is a timing diagram of one embodiment of a multi-frame software sequencing routine for a companion DMA system.

Turning now to FIG. 12, a diagram 1200 of one embodiment of a multi-frame software sequencing routine for a companion DMA system is shown. At the start of the routine, producers 1205 and 1210, consumer 1215, and route manager 1220 are brought out of reset. It is noted that producers 1205 and 1210 are also referred to as P0 and P1 and consumer 1215 is also referred to as C0. After producers 1205 and 1210, consumer 1215, and route manager 1220 are brought out of reset, the software executing on the system pushes route descriptors associated with frame 0 into the appropriate route descriptor queue. In one embodiment, the software pushes route descriptors to the route manager 1220 by writing to a corresponding route descriptor queue register. Also, after producers 1205 and 1210 and consumer 1215 are brought out of reset, the software pushes DMA configuration data for frame 0 into the shadow DMA registers. The software sequencing routine for frame 0 is repeated for frame 1.

Figure 13:
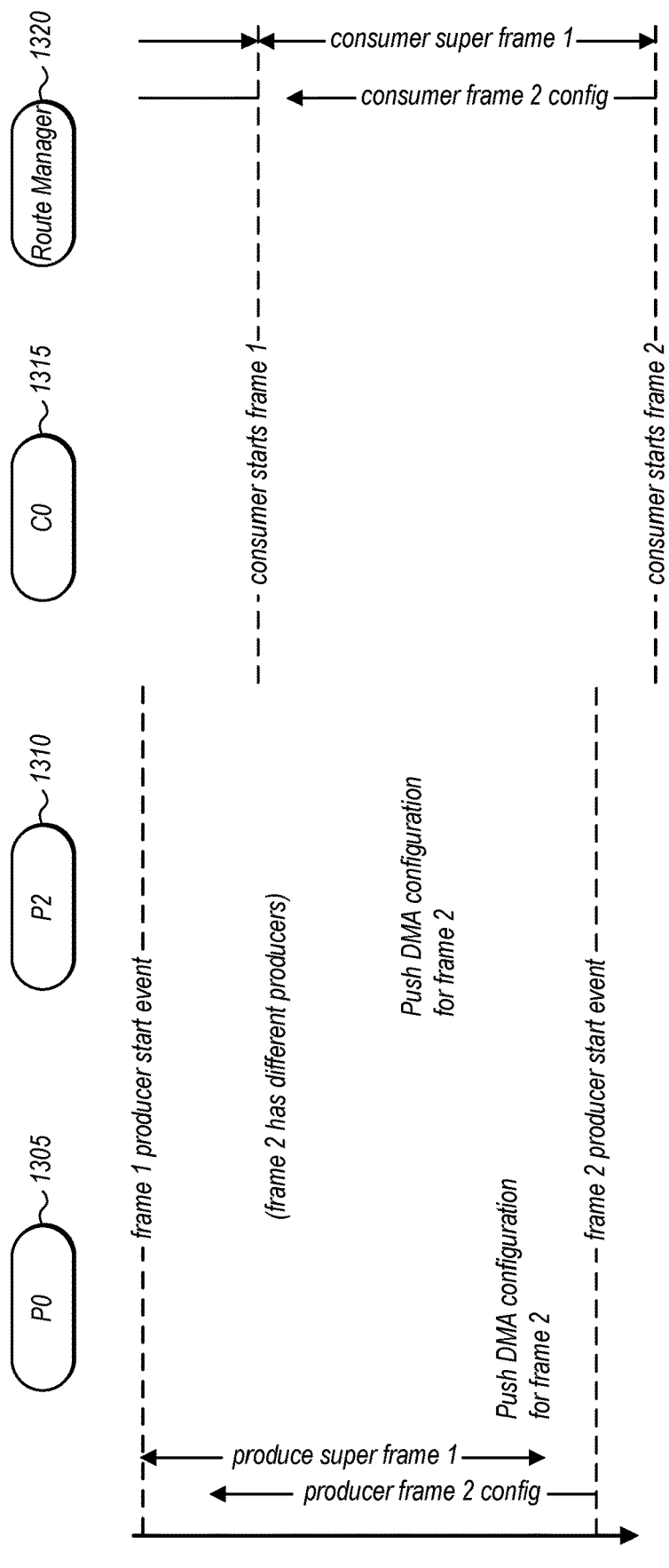
FIG. 13 is a timing diagram of one embodiment of a multi-frame software sequencing routine for a companion DMA system.

Referring now to FIG. 13, a diagram 1300 of one embodiment of a multi-frame software sequencing routine for a companion DMA system is shown. Diagram 1300 is intended to be a continuation of the routine illustrated in diagram 1200 (of FIG. 12). At the top of diagram 1300, frame 2 has different producers P0 and P2 as compared to frame 1 which had producers P0 and P1. Producers P0 and P2 are also referred to as producers 1305 and 1310. Consumer 1315, also referred to as C0, is the only consumer in this example, while route manager 1320 is intended to represent route manager 1220. As shown in diagram 1300, there is an overlap between frame 1 being produced and configuration of the frame 2 producers. For both producers P0 and P2, the software pushes the route descriptor for frame 2 to the route manager 1320 and the software pushes the DMA configuration data into the shadow DMA registers. It is noted that this software sequencing routine can continue for any number of subsequent frames.

Turning now to FIG. 14, a table 1400 with fields of a producer route table entry in accordance with one embodiment is shown. Entry 1405 of table 1400 corresponds to the active field of a producer route table entry. The active field indicates whether the entry is actively routing credits. Entry 1410 represents the "Is Producer?" field which indicates whether this route table entry is associated with a producer. In one embodiment, the "Is Producer?" field will be 1 if the route table entry is associated with a producer or the "Is Producer?" field will be 0 if the route table entry is associated with a consumer. Entry 1415 corresponds to a local DMA ID field which identifies the local credit wire associated with the route table entry. Entry 1420 shows the destination router ID field which includes an ID of the remote peer router table that the credits are sent to via a fabric write. In one embodiment, the address of the remote router mailbox is stored in a remote router address register.

Entry 1425 corresponds to a destination DMA ID field which stores an identifier of the DMA engine in the destination router. Entry 1430 shows the route manager ID field which identifies the route manager that initiated and manages this route. In one embodiment, the lower bits of the route manager ID field identify the corresponding route descriptor queue within the route manager. Entry 1435 corresponds to a buffer write pointer field which includes the producer write pointer to the location of the next credit to be written to the circular buffer. Entry 1440 shows the buffer read pointer field which stores the pointer to the next credit to be consumed by the consumer.

Referring now to FIG. 15, a table 1500 with fields of a consumer route table entry in accordance with one embodiment is shown. Entries 1505, 1510, 1515, 1520, 1525, and 1530 are the same as entries 1405, 1410, 1415, 1420, 1425, and 1430, respectively, of table 1400 (of FIG. 14). Entry 1535 shows the buffer read pointer field which stores the pointer to the next credit to be consumed by the consumer. Entry 1540 corresponds to a buffer write pointer field which includes the producer write pointer to the location of the next credit to be written to the circular buffer. Entry 1535 is the same as entry 1440 of table 1400, and entry 1540 is the same as entry 1435 of table 1400, but the order is reversed for the consumer route table entry.

Turning now to FIG. 16, a table 1600 with fields of a companion wrapper for a DMA engine in accordance with one embodiment is shown. Entry 1605 corresponds to a buffer write pointer field which includes the producer write pointer to the location of the next credit to be written to the circular buffer. Entry 1610 shows the buffer read pointer field which stores the pointer to the next credit to be consumed by the consumer. Buffer size field 1615 specifies the size of the circular buffer in terms of a number of credits.

In another embodiment, buffer size field 1615 specifies the size of the circular buffer in terms of a number of bytes. In this embodiment, a conversion could be performed to convert the value in buffer size field 1615 into a number of credits.

For a producer DMA engine, frame pointer field 1620 points to the next credit in the frame where the producer DMA engine will write to in the buffer. For a consumer DMA engine, frame pointer field 1620 points to the next credit in the frame where the consumer DMA engine will read from out of the buffer. Frame size field 1625 specifies the total frame size in credits including the start, middle, and done increments. The DMA engine is considered done after processing a number of credits equal to the value specified in frame size field 1625. Frame start increment field 1630 specifies the number of credits to increment by at the start of the frame. Frame start increment field 1630 enables the producer to skip over credits which the producer does not produce. Frame middle increment field 1635 specifies the number of credits to increment by within the interior of the frame. Frame midpoint increment field 1635 enables sub-sampling or skipping of credits written to the buffer. Frame done increment field 1640 specifies the number of credits to send to the consumer when the producer frame is done. Frame done increment field 1640 enables the producer to skip over credits that the producer does not produce. Start offset field 1645 specifies the value the space-available credits needs to reach at the beginning of a frame before data is produced. Disable remote field 1650 specifies whether to disable remote flow control messages so as to support the NULL connection feature. The NULL connection feature allows a link to be disabled while still processing the rest of the frame as if all remote credits were received.

Figure 17:
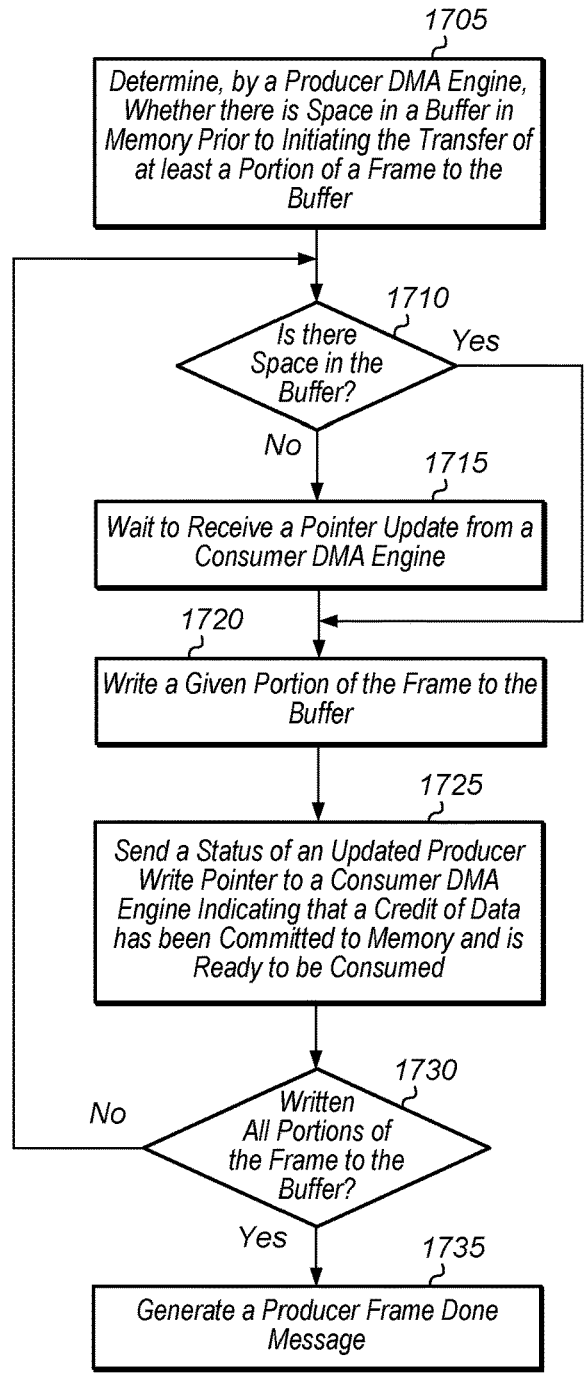
FIG. 17 is a flow diagram of one embodiment of a method for the operation of a producer DMA engine.

Turning now to FIG. 17, a generalized flow diagram of one embodiment of a method 1700 for the operation of a producer DMA engine is shown. For purposes of discussion, the steps in this embodiment (as well as for FIGS. 18-22) are shown in sequential order. However, in other embodiments some steps may occur in a different order than shown, some steps may be performed concurrently, some steps may be combined with other steps, and some steps may be absent.

A producer DMA engine determines whether there is space in a buffer in memory prior to initiating the transfer of at least a portion of a frame to the buffer (block 1705). While method 1700 is described in the context of a frame being transferred, it should be understood that this is merely one possible implementation of method 1700. In other embodiments, the producer DMA engine may transfer other types of datasets besides image or video frames. If there is no space in the buffer (conditional block 1710, "no" leg), then the producer DMA engine waits to receive a pointer update (i.e., indicating a data credit has been consumed and space is available in the buffer) from a consumer DMA engine (block 1715). If there is space in the buffer (conditional block 1710, "yes" leg), then the producer DMA engine writes a given portion of the frame to the buffer (block 1720). When the producer DMA engine finishes writing a given portion of the frame to the buffer in memory, the producer sends a status of its updated producer write pointer to a consumer DMA engine indicating a credit of data has been committed to memory and is ready to be consumed (block 1725). It is assumed for the purposes of this discussion that a size of the portion of data referred to in blocks 1720 and 1725 corresponds to a single credit worth of data.

If the producer DMA engine has finished writing all portions of the frame to the buffer (conditional block 1730, "yes" leg), then the producer DMA engine generates a producer frame done message (block 1735). After block 1735, method 1700 ends. Alternatively, after block 1735, another instance of method 1700 is launched for each producer DMA engine that is producing the next frame in the video sequence. It is noted that a new instance of method 1700 may be initiated for the producer DMA engine to produce a new frame while the consumer DMA engine is still consuming the previous frame. If the producer DMA engine has not finished writing all portions of the frame to the buffer (conditional block 1730, "no" leg), then method 1700 returns to conditional block 1710.

Figure 18:
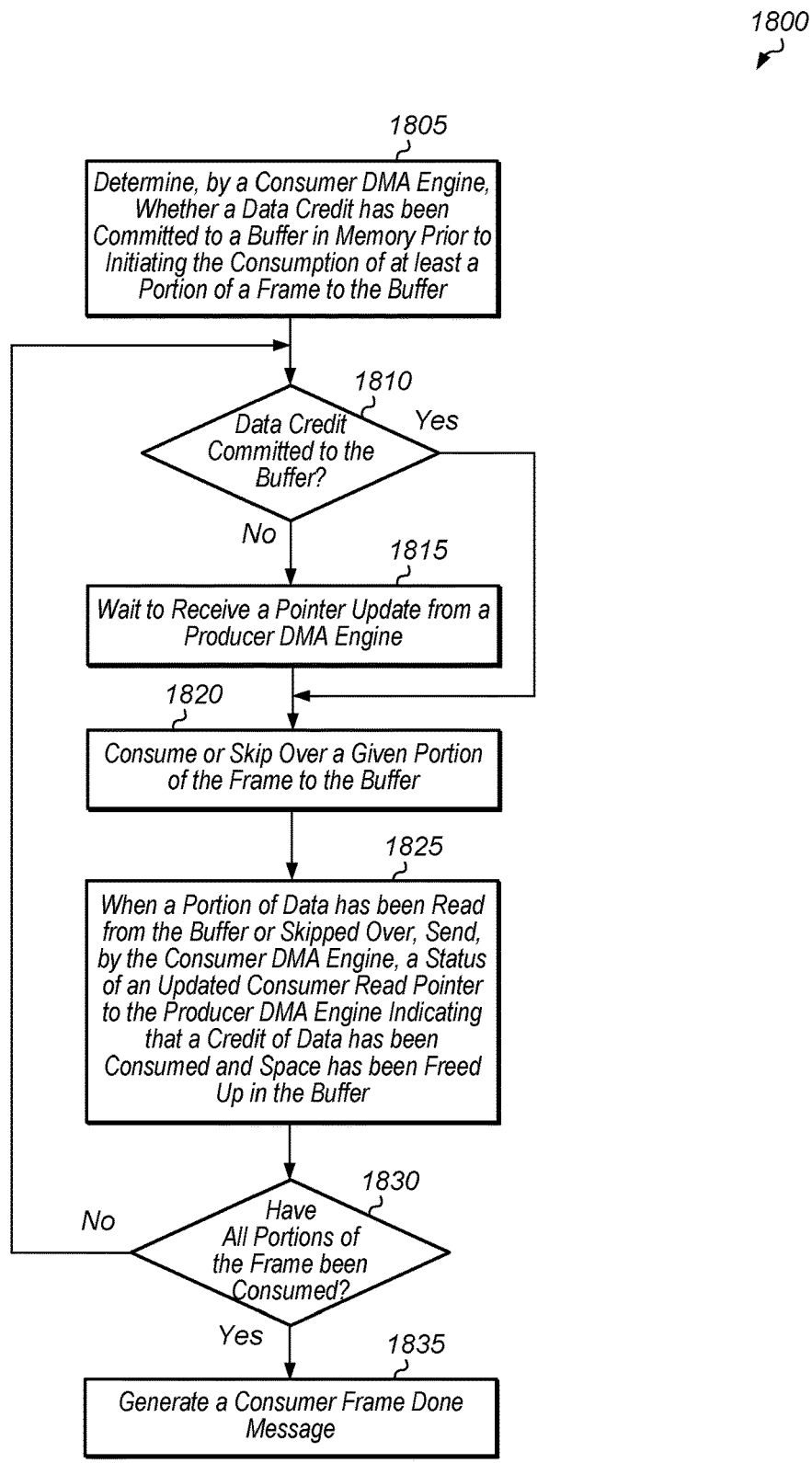
FIG. 18 is a flow diagram of one embodiment of a method for the operation of a consumer DMA engine.

Turning now to FIG. 18, a generalized flow diagram of one embodiment of a method 1800 for the operation of a consumer DMA engine is shown. A consumer DMA engine determines whether a data credit has been committed to a buffer in memory prior to initiates the consumption of at least a portion of a frame from the buffer (block 1805). While method 1800 is described in the context of a frame being consumed, it should be understood that this is merely one possible implementation of method 1800. In other embodiments, the consumer DMA engine may consume other types of datasets besides image or video frames. If a data credit has not been committed to the buffer (conditional block 1810, "no" leg), then the consumer DMA engine waits to receive a pointer update (i.e., indicating a data credit has been committed to the buffer and is ready to be consumed) from a producer DMA engine (block 1815). If a data credit has been committed to the buffer (conditional block 1810, "yes" leg), then the consumer DMA engine consumes or skips over a portion of the frame from the buffer (block 1820). When the consumer DMA engine finishes consuming or skipping over a given portion of the frame from the buffer in memory, the consumer sends a status of its updated consumer read pointer to a producer DMA engine indicating that a credit of data has been consumed and space has been freed up in the buffer (block 1825). It is assumed for the purposes of this discussion that a size of the portion of data referred to in blocks 1820 and 1825 corresponds to a single credit worth of data.

If the consumer DMA engine has finished consuming all portions of the frame from the buffer (conditional block 1830, "yes" leg), then the consumer DMA engine generates a consumer frame done message (block 1835). After block 1835, method 1800 ends. Alternatively, after block 1835, another instance of method 1800 is launched for each consumer DMA engine that is consuming the next frame in the video sequence. If the consumer DMA engine has not finished consuming all portions of the frame from the buffer (conditional block 1830, "no" leg), then method 1800 returns to conditional block 1810. It is noted that method 1800 can be performed in conjunction with method 1700 (of FIG. 17). For example, a separate instance of method 1700 may be performed by each producer DMA engine which is transferring data to the buffer in parallel with a separate instance of method 1800 being performed by each consumer DMA engine which is consuming data from the buffer.

Figure 19:
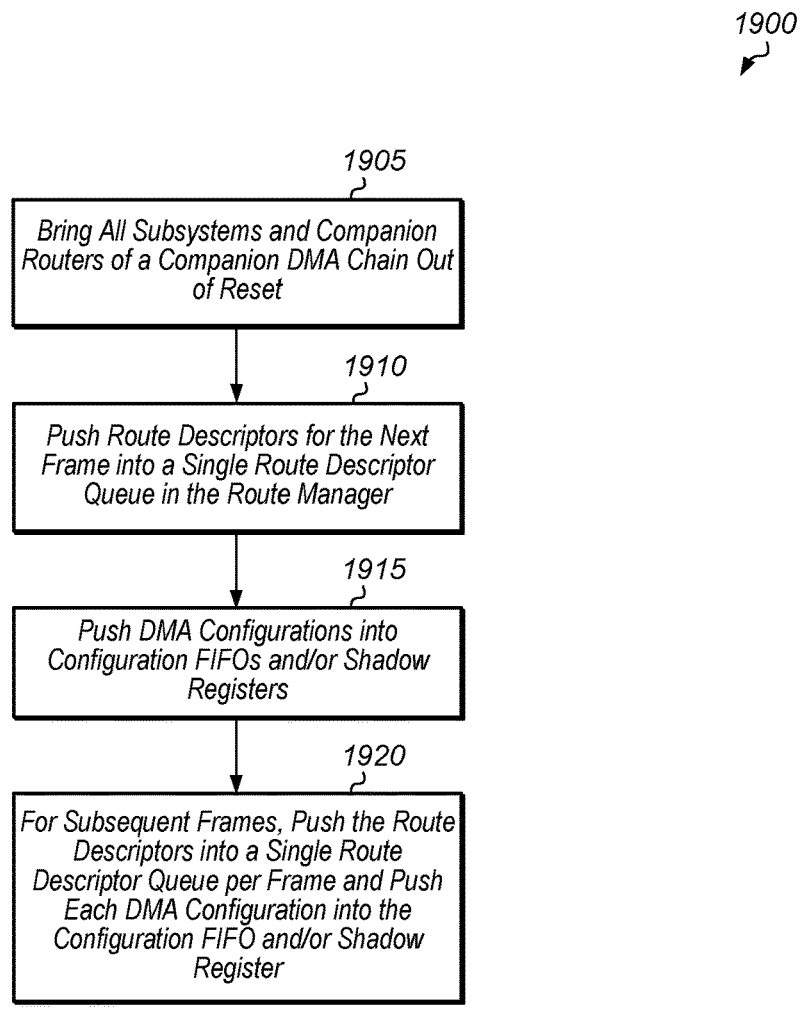
FIG. 19 is a flow diagram of one embodiment of a method for software launching a companion DMA chain.

Referring now to FIG. 19, one embodiment of a method 1900 for software launching a companion DMA chain is shown. Software executing on one of more processor(s) brings all subsystems and companion routers of a companion DMA chain out of reset (block 1905). Once all subsystems and companion routers of a companion DMA chain have been brought out of reset and when software is ready to schedule the next frame, software pushes route descriptors for the next frame into a single route descriptor queue in the route manager (block 1910). Also, software pushes DMA configurations into configuration FIFOs and/or shadow registers (block 1915). It is noted that block 1915 may be performed before block 1910 in some embodiments. In other words, there is no required ordering for blocks 1910 and 1915, and they can be performed in any order or simultaneously. For subsequent frames, software pushes the route descriptors into a single route descriptor queue per frame and pushes each DMA configuration into the configuration FIFO and/or shadow register (block 1920). By performing block 1920, this ensures that the route manager and DMA engines are ready to process a subsequent frame once the subsequent frame starts flowing through the chain. After block 1920, method 1900 ends. It is noted that software can push the route descriptors and the DMA configurations anytime before the associated frame starts, including several frames ahead of time.

Turning now to FIG. 20, one embodiment of a method 2000 for advancing in a buffer by a programmable skip amount without consuming data credits is shown. An programmable credit skip amount is specified during transfer of a given frame from a producer DMA engine to a consumer DMA engine (block 2005). The programmable credit skip amount indicates how far within a buffer the consumer DMA engine is to jump ahead during consumption of credits from the buffer. Multiple different programmable credit skip amounts can be specified per frame. In one embodiment, the programmable credit skip amount is specified in response to detecting a time-warp condition. For example, a time-warp condition involves updating an image presented to a user if the user's head moves after frame rendering was initiated. In one embodiment, an application includes gaze tracking where the consumer may read a subset or subframe of a rendered frame based on the user's gaze point within that frame. In other embodiments, the programmable credit skip amount is specified for other scenarios, such as during the generation of a superframe or otherwise.

Next, the consumer DMA engine consumes data from a buffer location one or more credits in front of a current location of a read pointer (block 2010). In one embodiment, the consumer DMA engine selects the buffer location to read from in block 2010 based on the programmable credit skip amount. Next, the consumer DMA engine increments the read pointer by multiple credits in response to consuming data from the buffer location one or more credits in front of the current location of the read pointer (block 2015). Then, the consumer DMA engine sends an updated read pointer to the producer DMA engine (block 2020). After block 2020, method 2000 ends. By performing method 2000, the consumer DMA engine allows the producer DMA engine to keep making forward progress on the transfer of the frame, relieving any potential back pressure on the producer DMA engine.

Figure 21:
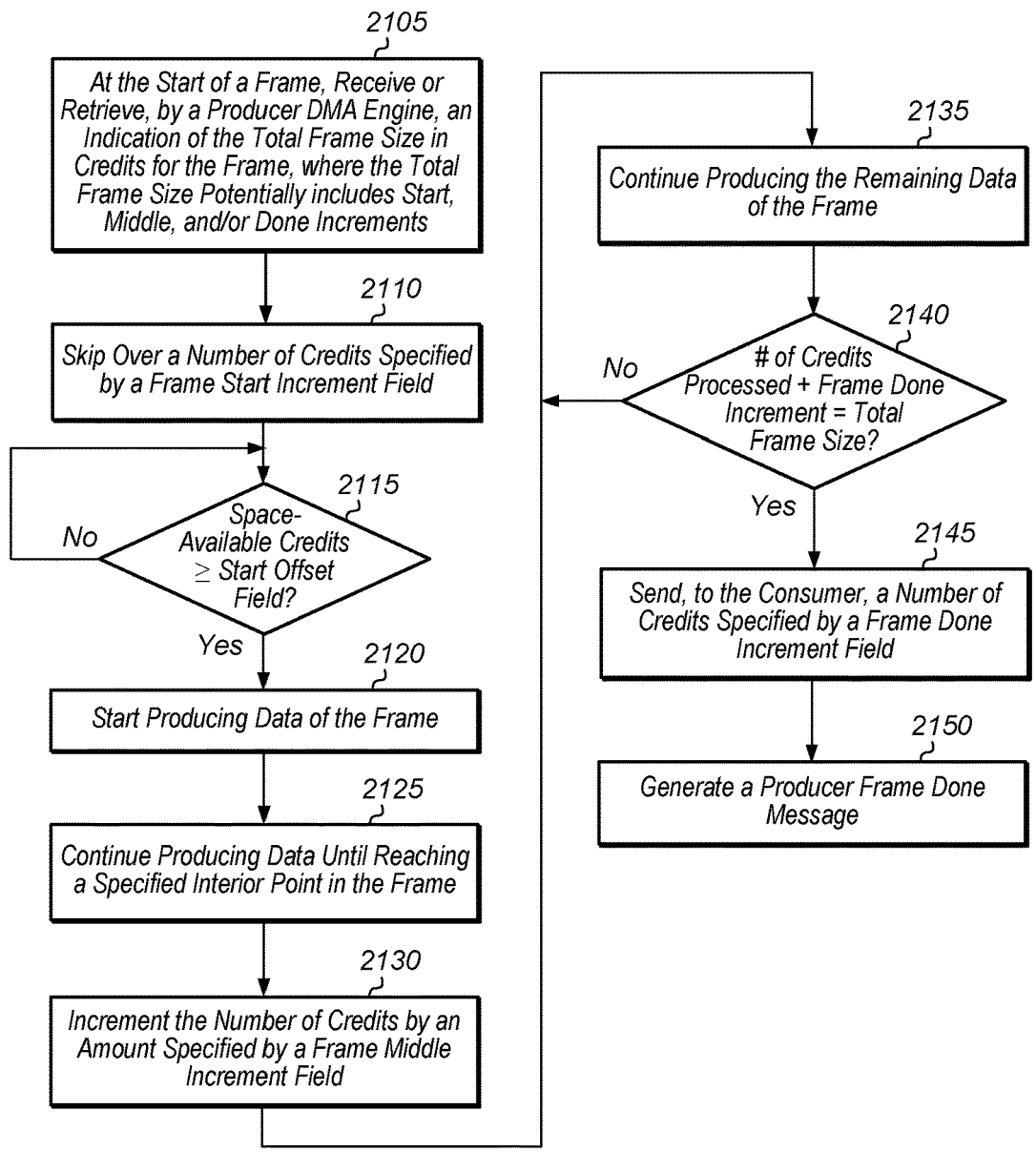
FIG. 21 is a flow diagram of one embodiment of a method for a producer DMA engine producing a frame.

Referring now to FIG. 21, one embodiment of a method 2100 for a producer DMA engine producing a frame is shown. At the start of a frame, a producer DMA engine receives or retrieves an indication of the total frame size in credits for the frame, where the total frame size potentially includes start, middle, and/or done increments (block 2105). The producer DMA engine skips over a number of credits specified by a frame start increment field (block 2110). Block 2110 enables a producer to skip over credits which the producer does not produce. It is noted that the frame start increment field could be equal to zero, which would mean the producer DMA engine does not skip over any credits. If the space-available credits are greater than or equal to a start offset field (conditional block 2115, "yes" leg), then the producer starts producing data of the frame (block 2120). It is noted that "producing data" is defined as writing or skipping over data. Otherwise, if the space-available credits are less than the start offset field (conditional block 2115, "no" leg), then method 2100 remains at conditional block 2115 until the consumer(s) consume enough data for the space-available credits to reach the value specified by the start offset field.

After block 2120, the producer continues producing data until reaching a specified interior point in the frame (block 2125). Then, the producer increments the number of credits by an amount specified by a frame middle increment field (block 2130). Block 2130 enables sub-sampling or skipping of credits written to the buffer. It is noted that blocks 2125 and 2130 are optional and may be skipped over in some embodiments. Alternatively, in other embodiments, blocks 2125 and 2130 may be repeated multiple times for multiple different interior points within the frame. Next, the producer continues producing the remaining data of the frame (block 2135). If the producer has processed a number of credits equal to the total frame size minus the frame done increment (conditional block 2140, "yes" leg), the producer sends, to the consumer, a number of credits specified by a frame done increment field (block 2145). Then, the producer generates a producer frame done message (block 2150). After block 2150, method 2100 ends. Otherwise, if the producer has not processed a number of credits equal to the total frame size minus the frame done increment (conditional block 2140, "no" leg), then method 2100 returns to block 2135.

Figure 22:
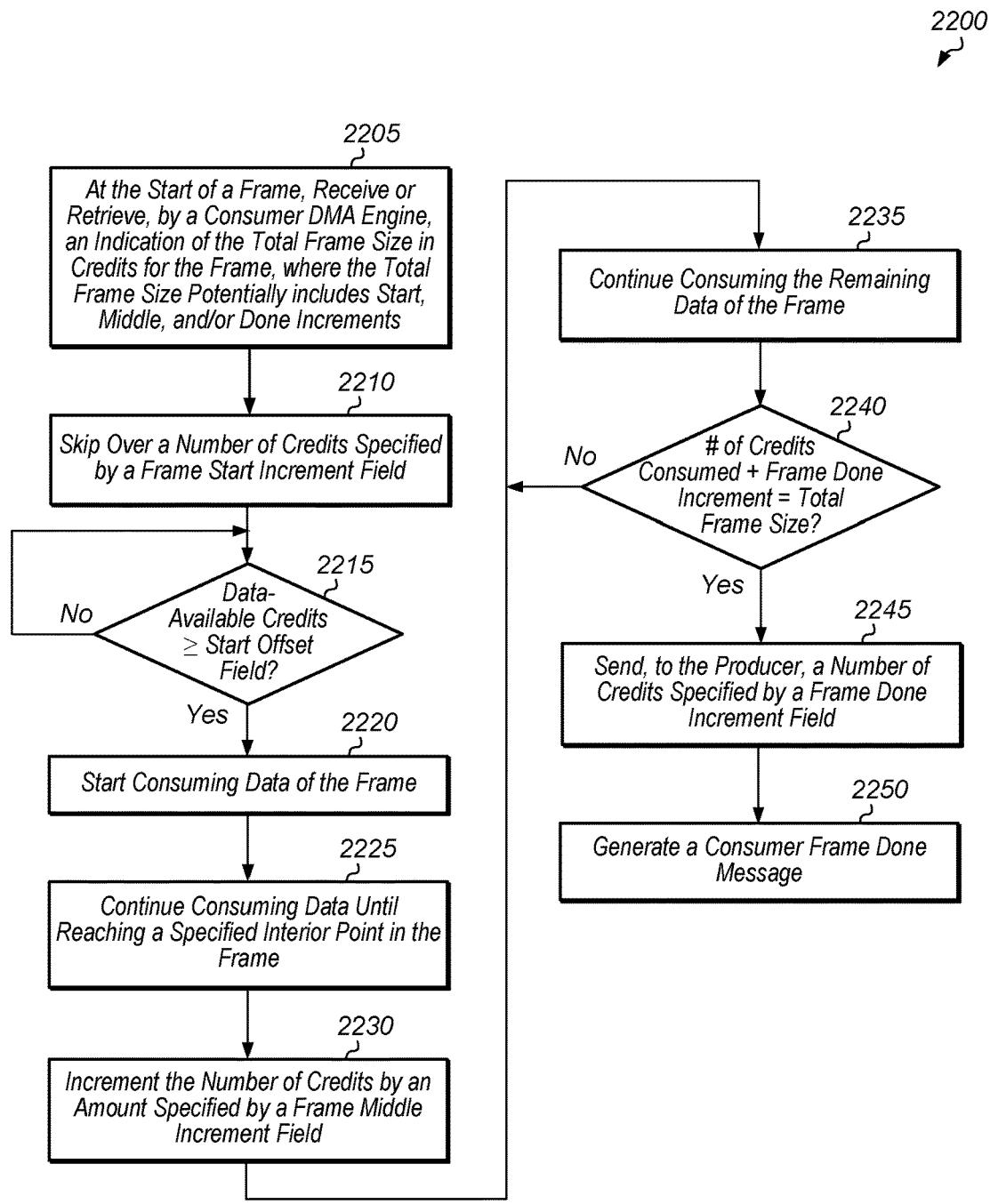
FIG. 22 is a flow diagram of one embodiment of a method for a consumer DMA engine consuming a frame.

Referring now to FIG. 22, one embodiment of a method 2200 for a consumer DMA engine consuming a frame is shown. At the start of a frame, a consumer DMA engine receives or retrieves an indication of the total frame size in credits for the frame, where the total frame size potentially includes start, middle, and/or done increments (block 2205). The consumer DMA engine skips over a number of credits specified by a frame start increment field (block 2210). Block 2210 enables a consumer to skip over credits which the consumer does not consume. It is noted that the frame start increment field could be equal to zero, which would mean the consumer DMA engine does not skip over any credits. If the data-available credits are greater than or equal to a start offset field (conditional block 2215, "yes" leg), then the consumer starts consuming data of the frame (block 2220). It is noted that "consuming data" is defined as reading or skipping over data. Otherwise, if the data-available credits are less than the start offset field (conditional block 2215, "no" leg), then method 2200 remains at conditional block 2215 until the producer(s) produce enough data for the data-available credits to reach the value specified by the start offset field.

After block 2220, the consumer continues consuming data until reaching a specified interior point in the frame (block 2225). Then, the consumer increments the number of credits by an amount specified by a frame middle increment field (block 2230). Block 2230 enables sub-sampling or skipping of credits consumed from the buffer. It is noted that blocks 2225 and 2230 are optional and may be skipped over in some embodiments. Alternatively, in other embodiments, blocks 2225 and 2230 may be repeated multiple times for multiple different interior points within the frame. Next, the consumer continues consuming the remaining data of the frame (block 2235). If the consumer has consumed a number of credits equal to the total frame size minus the frame done increment (conditional block 2240, "yes" leg), the consumer sends, to the producer, a number of credits specified by a frame done increment field (block 2245). Then, the consumer generates a consumer frame done message (block 2250). After block 2250, method 2200 ends. Otherwise, if the consumer has not consumed a number of credits equal to the total frame size minus the frame done increment (conditional block 2240, "no" leg), then method 2200 returns to block 2235.

Figure 23:
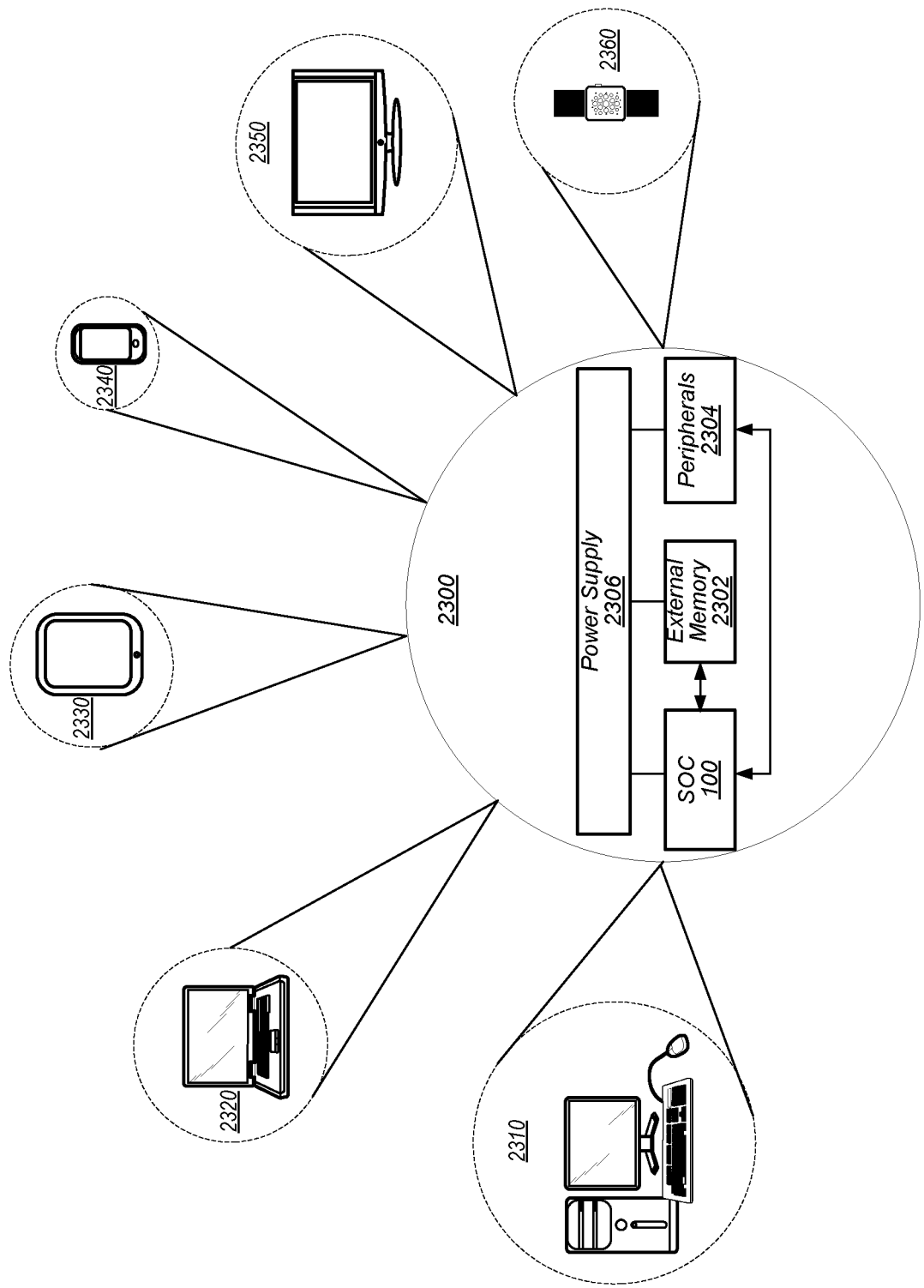
FIG. 23 is a block diagram of one embodiment of a system.

Referring now to FIG. 23, a block diagram of one embodiment of a system 2300 is shown. As shown, system 2300 may represent chip, circuitry, components, etc., of a desktop computer 2310, laptop computer 2320, tablet computer 2330, cell or mobile phone 2340, television 2350 (or set top box configured to be coupled to a television), wrist watch or other wearable item 2360, or otherwise. Other devices are possible and are contemplated. In the illustrated embodiment, the system 2300 includes at least a portion of SOC 100 (of FIG. 1) coupled to one or more peripherals 2304 and the external memory 2302. A power supply 2306 is also provided which supplies the supply voltages to SOC 100 as well as one or more supply voltages to the memory 2302 and/or the peripherals 2304. In various embodiments, power supply 2306 may represent a battery (e.g., a rechargeable battery in a smart phone, laptop or tablet computer). In some embodiments, more than one instance of apparatus 100 may be included (and more than one external memory 2302 may be included as well).

The memory 2302 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with SOC 100 in a chip-on-chip configuration, a package-on-package configuration, or a multi-chip module configuration.

The peripherals 2304 may include any desired circuitry, depending on the type of system 2300. For example, in one embodiment, peripherals 2304 may include devices for various types of wireless communication, such as wifi, Bluetooth, cellular, global positioning system, etc. The peripherals 2304 may also include additional storage, including RAM storage, solid state storage, or disk storage. The peripherals 2304 may include user interface devices such as a display screen, including touch display screens or multitouch display screens, keyboard or other input devices, microphones, speakers, etc.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
    a buffer;
    a consumer direct memory access (DMA) engine; and
    a producer DMA engine comprising circuitry configured to:
        send, responsive to storing data to a first location in the buffer, a write pointer to the consumer DMA engine that identifies the first location to indicate data at the first location is ready to be consumed; and
        send, responsive to detecting a given condition and without storing data to a second location in the buffer, an update to the write pointer to the consumer DMA engine that identifies the second location; and
    wherein the consumer DMA engine comprises circuitry configured to send, without consuming data at a third location in the buffer, a read pointer to the producer DMA engine that identifies the third location to indicate the third location is available for storing data.

2. The apparatus as recited in claim 1, wherein the data at the first location is a portion of a first frame of a video sequence and the buffer is a circular buffer with a size that is smaller than a size of the first frame, and wherein the producer DMA engine is configured to increment the write pointer after storing the data to the first location.

3. The apparatus as recited in claim 2, wherein the consumer DMA engine is configured to:
    skip data stored in the buffer by reading data from a second buffer location of the buffer that is one or more data credits in advance of a current location identified by the read pointer, wherein the second buffer location is specified by a programmable skip amount; and
    after reading data from the second buffer location, increment the read pointer.

4. The apparatus as recited in claim 3, further comprising a route manager configured to:
    manage initialization and updating of routing tables in a plurality of local routers; and
    retrieve route descriptors for the first frame from a corresponding route descriptor queue and initialize route entries in the plurality of local routers.

5. The apparatus as recited in claim 3, further comprising:
    a plurality of producer DMA engines comprising circuitry configured to transfer separate portions of the first frame to the buffer;
    a companion router configured to merge updates from the plurality of producer DMA engines sent to the write pointer; and
    a plurality of consumer DMA engines comprising circuitry configured to consume separate portions of the first frame from the buffer.

6. The apparatus as recited in claim 3, wherein any subsequent storage of data in the buffer does not include produced data corresponding to the one or more data credits that are skipped.

7. The apparatus as recited in claim 1, wherein the given condition is at least one of detection of a time-warp condition and generation of a superframe.

8. A method, comprising:
    storing, by circuitry of a producer direct memory access (DMA) engine, data to a first location in a buffer;
    sending, by the producer DMA engine responsive to storing the data, a write pointer to a consumer DMA engine that identifies the first location and indicates the data is ready to be consumed;

sending, by circuitry of the producer DMA engine responsive to detecting a given condition and without storing data to a second location in the buffer, an update to the write pointer to the consumer DMA engine that identifies a second location in the buffer;

consuming, by the consumer DMA engine, data stored in the buffer; and sending, without consuming data at a third location in the buffer, a read pointer to the producer DMA engine that identifies the third location in the buffer is available for storing data.

9. The method as recited in claim 8, wherein the data at the first location is a portion of a first frame of a video sequence and the buffer is a circular buffer with a size that is smaller than a size of the first frame, and wherein the method further comprises incrementing the write pointer by multiple data credits after writing data to a first buffer location.

10. The method as recited in claim 9, further comprising:
skipping, by the consumer DMA engine, data stored in the buffer by reading data from a second buffer location of the buffer that is one or more data credits in advance of a current location identified by the read pointer, responsive to determining the data stored in the buffer being skipped are not needed.

11. The method as recited in claim 10, further comprising:
managing, by a route manager, initialization and updating of routing tables in a plurality of local routers; and
retrieving route descriptors for the first frame from a corresponding route descriptor queue and initializing route entries in the plurality of local routers.

12. The method as recited in claim 10, further comprising:
transferring, by a plurality of producer DMA engines, separate corresponding portions of the first frame to the buffer;
merging, by a companion router, updates from the plurality of producer DMA engines sent to the write pointer; and
consuming, by a plurality of consumer DMA engines, separate portions of the first frame from the buffer.

13. The method as recited in claim 10, wherein any subsequent storage of data in the buffer does not include produced data corresponding to the one or more data credits that are skipped.

14. The method as recited in claim 8, wherein the given condition is at least one of detection of a time-warp condition and generation of a superframe.

15. A system, comprising:
a buffer; and
a producer direct memory access (DMA) engine comprising circuitry configured to:
produce data;
write the data to the buffer; and
generate, responsive to writing the data to a first location in the buffer, a write pointer that identifies a first location in the buffer to indicate the data at the first location is ready to be consumed; and
generate, responsive to detecting a given condition and without storing data to a second location in the buffer, an updated write pointer that identifies the second location in the buffer.

16. The system as recited in claim 15 further comprising a consumer DMA engine, wherein the producer DMA engine is configured to receive a read pointer from the consumer DMA engine that identifies a third location in the buffer and indicates the third location is available for storing data.

17. The system as recited in claim 16, wherein the data at the first location is a portion of a first frame of a video sequence and the buffer is a circular buffer with a size that is smaller than a size of the first frame.

18. The system as recited in claim 17, wherein the given condition is at least one of detection of a time-warp condition and generation of a superframe.

19. The system as recited in claim 17, wherein the consumer DMA engine is configured to:
read, from a second buffer location of the buffer, one or more data credits in advance of a current location of the read pointer, wherein the second buffer location is specified by a programmable skip amount; and
after reading data from the second buffer location, increment the read pointer by multiple data credits.

20. The system as recited in claim 19, further comprising a route manager configured to:
manage initialization and updating of routing tables in a plurality of local routers; and
retrieve route descriptors for the first frame off of a corresponding route descriptor queue and initialize route entries in the plurality of local routers.

* * * * *